(12) United States Patent
So et al.

(10) Patent No.: US 12,510,985 B2
(45) Date of Patent: Dec. 30, 2025

(54) ELECTRONIC DEVICE AND INTERFACE DEVICE INCLUDING THE SAME

(71) Applicant: Samsung Display Co., Ltd., Yongin-si (KR)

(72) Inventors: Yongsub So, Yongin-si (KR); Sanghun Park, Yongin-si (KR); Da Eun Yi, Yongin-si (KR); Soongyu Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/453,102

(22) Filed: Aug. 21, 2023

(65) Prior Publication Data

US 2024/0143104 A1 May 2, 2024

(30) Foreign Application Priority Data

Oct. 28, 2022 (KR) ........................ 10-2022-0140821

(51) Int. Cl.
*G06F 3/041* (2006.01)
*G06F 1/16* (2006.01)
(Continued)

(52) U.S. Cl.
CPC .......... *G06F 3/0416* (2013.01); *G06F 1/1652* (2013.01); *G06F 3/0412* (2013.01); *G06V 40/13* (2022.01); *H04M 1/0268* (2013.01)

(58) Field of Classification Search
CPC .... G06F 3/0416; G06F 1/1652; G06F 3/0412; G06F 1/1643; G06F 3/03545;
(Continued)

(56) References Cited

U.S. PATENT DOCUMENTS 9,495,011 B1 * 11/2016 Lee .................... G06F 3/03547
10,936,126 B2 3/2021 Lee et al.
(Continued)

FOREIGN PATENT DOCUMENTS

CN 109445647 A 3/2019
KR 10-1453028 B1 10/2014
(Continued)

*Primary Examiner* — Matthew A Eason
*Assistant Examiner* — Chayce R Bibbee
(74) *Attorney, Agent, or Firm* — Womble Bond Dickinson (US) LLP

(57) ABSTRACT

An electronic device includes: a display layer including a pixel including a pixel driving circuit and a light emitting element, and a sensor including a sensor driving circuit and a sensing element, and displaying an image during a plurality of frame periods; a sensor layer on the display layer and exchanging a signal with an input device and sensing an input by a touch; a fingerprint controller controlling the sensor; and a sensor controller controlling the sensor layer, wherein the sensor is configured to sense a first input by the input device, and a second input by a biometric information, wherein, in response to the sensor layer sensing the signal, the sensor controller transmits a control signal to the fingerprint controller, and wherein the fingerprint controller is configured to provide the sensor controller with information of the first input sensed by the sensor.

19 Claims, 18 Drawing Sheets

(51) Int. Cl.
*G06V 40/13* (2022.01)
*H04M 1/02* (2006.01)

(58) Field of Classification Search
CPC .... G06F 3/04166; G06F 3/0446; G06F 3/046;
G06V 40/13; G06V 40/1318; H04M
1/0268; H04M 1/0214
See application file for complete search history.

(56) References Cited

U.S. PATENT DOCUMENTS

| | | | |
|---|---|---|---|
| 2009/0314553 A1* | 12/2009 | Underwood | G06F 3/0321 |
| | | | 178/19.05 |
| 2017/0038911 A1* | 2/2017 | Lin | G06F 3/0421 |
| 2018/0218195 A1* | 8/2018 | Sheik-Nainar | G06V 10/141 |
| 2018/0373361 A1* | 12/2018 | Her | G06F 3/044 |
| 2020/0133414 A1* | 4/2020 | Lee | G06F 3/044 |
| 2022/0012454 A1* | 1/2022 | Lin | G06F 3/0443 |
| 2022/0187941 A1* | 6/2022 | Park | G06F 3/0416 |
| 2023/0221810 A1 | 7/2023 | Yoo et al. | |

FOREIGN PATENT DOCUMENTS

| | | |
|---|---|---|
| KR | 10-1543352 B1 | 8/2015 |
| KR | 10-2020-0049959 A | 5/2020 |
| KR | 10-2022-0082604 A | 6/2022 |
| KR | 10-2023-0109798 A | 7/2023 |

* cited by examiner

ELECTRONIC DEVICE AND INTERFACE DEVICE INCLUDING THE SAME

CROSS-REFERENCE TO RELATED APPLICATIONS

The present application claims priority to and the benefit of Korean Patent Application No. 10-2022-0140821 filed on Oct. 28, 2022, in the Korean Intellectual Property Office, the entire disclosure of which is incorporated herein by reference.

BACKGROUND

1. Field

Aspects of some embodiments of the present disclosure described herein relate to an electronic device, and an interface device including the same.

2. Description of the Related Art

An electronic device may detect external input applied from the outside of the electronic device. The external input may be a user input. The user input may include various types of external inputs such as a part of a user body, light, heat, a pen, or pressure. The electronic device may recognize coordinates of a pen in an electromagnetic resonance (EMR) scheme or an active electrostatic (AES) scheme.

The above information disclosed in this Background section is only for enhancement of understanding of the background and therefore the information discussed in this Background section does not necessarily constitute prior art.

SUMMARY

Aspects of some embodiments of the present disclosure include an electronic device having relatively improved sensing reliability, and an interface device including the same.

According to some embodiments, an electronic device includes a display layer including a pixel including a pixel driving circuit and a light emitting element, and a sensor including a sensor driving circuit and a sensing element, and displaying an image during a plurality of frame periods, a sensor layer on the display layer and exchanging a signal with an input device and to sense an input by a touch, a fingerprint controller that controls the sensor, and a sensor controller that controls the sensor layer. According to some embodiments, the sensor senses a first input by the input device, and a second input by biometric information. According to some embodiments, when the sensor layer senses the signal, the sensor controller transmits a control signal to the fingerprint controller. According to some embodiments, the fingerprint controller provides the sensor controller with information of the first input sensed by the sensor.

According to some embodiments, during a first frame period among the plurality of frame periods, the sensor layer may sense the input by the touch, and during the first frame period, the sensor may sense the first input.

According to some embodiments, during the first frame period, the sensor layer may further sense a third input by the input device.

According to some embodiments, during the first frame period, the sensor may further sense the biometric information.

According to some embodiments, the first input may include infrared light.

According to some embodiments, the sensor layer may include a plurality of sensing electrodes, and an area size of each of the plurality of sensing electrodes may be greater than an area size of the sensing element.

According to some embodiments, the sensing element may include a plurality of sensing elements. According to some embodiments, the number of the plurality of sensing electrodes per unit area is less than the number of the plurality of sensing elements per the unit area.

According to some embodiments, a first frame period among the plurality of frame periods may include an uplink period, an acknowledgment period provided sequentially after the uplink period, and a touch period. According to some embodiments, the uplink period may be a period in which the sensor controller provides an uplink signal to the input device through the sensor layer. According to some embodiments, the acknowledgment period may be a period in which the sensor controller receives the signal, which is provided by the input device receiving the uplink signal. According to some embodiments, the touch period may be a period in which the sensor layer senses the input by the touch.

According to some embodiments, a second frame period, which is provided after the first frame period, from among the plurality of frame periods may include the touch period, an information sensing period, and a coordinate sensing period. According to some embodiments, the information sensing period may be adjacent to the touch period and is a period in which the sensor layer senses a third input by the input device. According to some embodiments, the coordinate sensing period may be a period in which the sensor senses the first input.

According to some embodiments, the coordinate sensing period may operate in the fingerprint controller. According to some embodiments, the touch period and the information sensing period may operate in the sensor controller.

According to some embodiments, an electronic device includes a display layer including a pixel including a pixel driving circuit and a light emitting element, and displaying an image during a plurality of frame periods, a sensor layer on the display layer and exchanging a signal with an input device and to sense an input by a touch, a biometric information sensing layer under the display layer and including a sensor, a fingerprint controller that controls the sensor, and a sensor controller that controls the sensor layer. According to some embodiments, the sensor senses a first input by the input device, and a second input by biometric information. According to some embodiments, when the sensor layer senses the signal, the sensor controller transmits a control signal to the fingerprint controller. According to some embodiments, the fingerprint controller provides the sensor controller with information of the first input sensed by the sensor.

According to some embodiments, during a first frame period among the plurality of frame periods, the sensor layer may sense the input by the touch, and during the first frame period, the sensor may sense the first input.

According to some embodiments, during the first frame period, the sensor layer may further sense a third input by the input device.

According to some embodiments, during the first frame period, the sensor may further senses the biometric information.

According to some embodiments, an interface device includes an electronic device and an input device configured to communicate with the electronic device. According to some embodiments, the electronic device includes a pixel including a pixel driving circuit and a light emitting element, a biometric information sensing sensor including a sensor driving circuit and a sensing element, an input sensing sensor including a plurality of sensing electrodes, a fingerprint controller that controls the biometric information sensing sensor, and a sensor controller that controls the input sensing sensor. According to some embodiments, the input device includes a reception circuit that receives an uplink signal from the input sensing sensor, a first transmission circuit that transmits infrared light to the sensing element, and a second transmission circuit that transmits an acknowledgment signal and a downlink signal to the input sensing sensor. According to some embodiments, the biometric information sensing sensor senses a first input by the infrared light and a second input by a fingerprint. According to some embodiments, when the sensor controller senses the acknowledgment signal, the sensor controller transmits a control signal to the fingerprint controller. According to some embodiments, the fingerprint controller provides the sensor controller with information of the first input sensed by the biometric information sensing sensor.

According to some embodiments, the sensing element may be on the same layer as the light emitting element.

According to some embodiments, the biometric information sensing sensor may be under the pixel.

According to some embodiments, the electronic device may display an image during a plurality of frame periods. According to some embodiments, during a first frame period among the plurality of frame periods, the input sensing sensor may sense an input by a touch. According to some embodiments, during the first frame period, the biometric information sensing sensor may sense the first input.

According to some embodiments, during the first frame period, the input sensing sensor may further sense the downlink signal.

According to some embodiments, during the first frame period, the biometric information sensing sensor may further sense biometric information.

BRIEF DESCRIPTION OF THE DRAWINGS

The above and other aspects and features of some embodiments of the present disclosure will become apparent by describing in more detail aspects of some embodiments thereof with reference to the accompanying drawings.

DETAILED DESCRIPTION

Figure 1A:
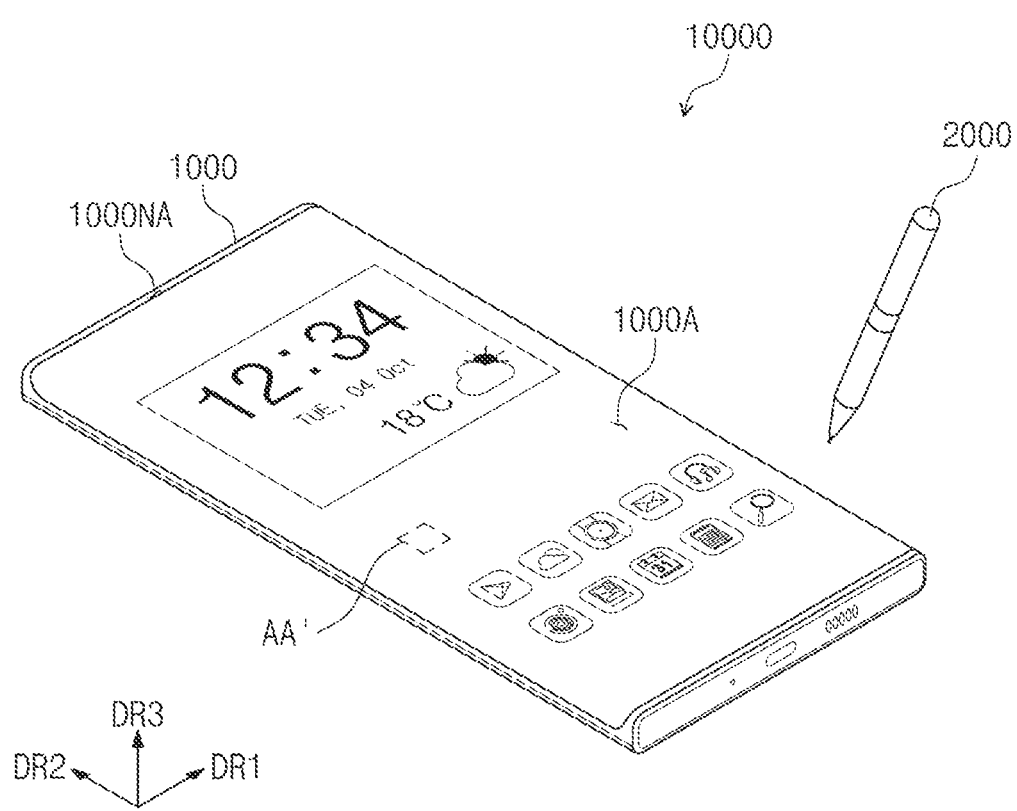
FIG. 1A is a perspective view of an interface device, according to some embodiments of the present disclosure.

In the specification, the expression that a first component (or region, layer, part, portion, etc.) is "on", "connected with", or "coupled with" a second component means that the first component is directly on, connected with, or coupled with the second component or means that a third component is interposed therebetween.

The same reference numerals refer to the same components. Also, in drawings, the thickness, ratio, and dimension of components are exaggerated for effectiveness of description of technical contents. The term "and/or" includes one or more combinations in each of which associated elements are defined.

Although the terms "first", "second", etc. may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component. The articles "a," "an," and "the" are singular in that they have a single referent, but the use of the singular form in the specification should not preclude the presence of more than one referent.

Also, the terms "under", "below", "on", "above", etc. are used to describe the correlation of components illustrated in drawings. The terms that are relative in concept are described based on a direction shown in drawings.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, aspects of some embodiments of the present disclosure will be described in more detail with reference to accompanying drawings.

FIG. 1A is a perspective view of an interface device, according to some embodiments of the present disclosure.

Referring to FIG. 1A, an interface device 10000 may include an electronic device 1000 and an input device 2000. The electronic device 1000 may detect a first input by the input device 2000. The interface device 10000 may also be referred to as a "digitizer".

The electronic device 1000 may be a device activated depending on an electrical signal. For example, the electronic device 1000 may be a mobile phone, a tablet, a car navigation system, a game console, or a wearable device, but is not limited thereto. FIG. 1A illustrates that the electronic device 1000 is a mobile phone.

An active area 1000A and a peripheral area 1000NA may be defined in the electronic device 1000. The electronic device 1000 may display images at the active area 1000A. The active area 1000A may include a surface defined by a first direction DR1 and a second direction DR2. The peripheral area 1000NA may surround the peripheral area of the active area 1000A.

A thickness direction of the electronic device 1000 may be parallel to a third direction DR3 intersecting the first direction DR1 and the second direction DR2. Accordingly, front surfaces (or upper surfaces) and back surfaces (or lower surfaces) of members constituting the electronic device 1000 may be defined with respect to the third direction DR3.

The electronic device 1000 may detect inputs applied from the outside of the electronic device 1000. The inputs applied from the outside may include various types of external inputs such as a portion of a user's body, light, heat, pressure, or the like. The inputs applied from the outside may be referred to as a "second input".

The electronic device 1000 illustrated in FIG. 1A may detect an input by the user's touch and an input by the input device 2000. The input device 2000 may refer to a device other than the user's body. The input by the input device 2000 may be referred to as a "first input". For example, the input device 2000 may be an active pen, a stylus pen, a touch pen, or an electronic pen. Hereinafter, it is described that the input device 2000 is an active pen.

The electronic device 1000 and the input device 2000 may be capable of bidirectional communication. The electronic device 1000 may provide an uplink signal to the input device 2000. For example, the uplink signal may include synchronization data or information of the electronic device 1000, but is not particularly limited thereto. The input device 2000 may provide a downlink signal to the electronic device 1000. The downlink signal may include state information of the input device 2000 or a synchronization signal. For example, the downlink signal may include coordinate information of the input device 2000, battery information of the input device 2000, slope information of the input device 2000, and/or various pieces of information stored in the input device 2000, but is not particularly limited thereto. The uplink signal and the downlink signal will be described later.

Figure 1B:
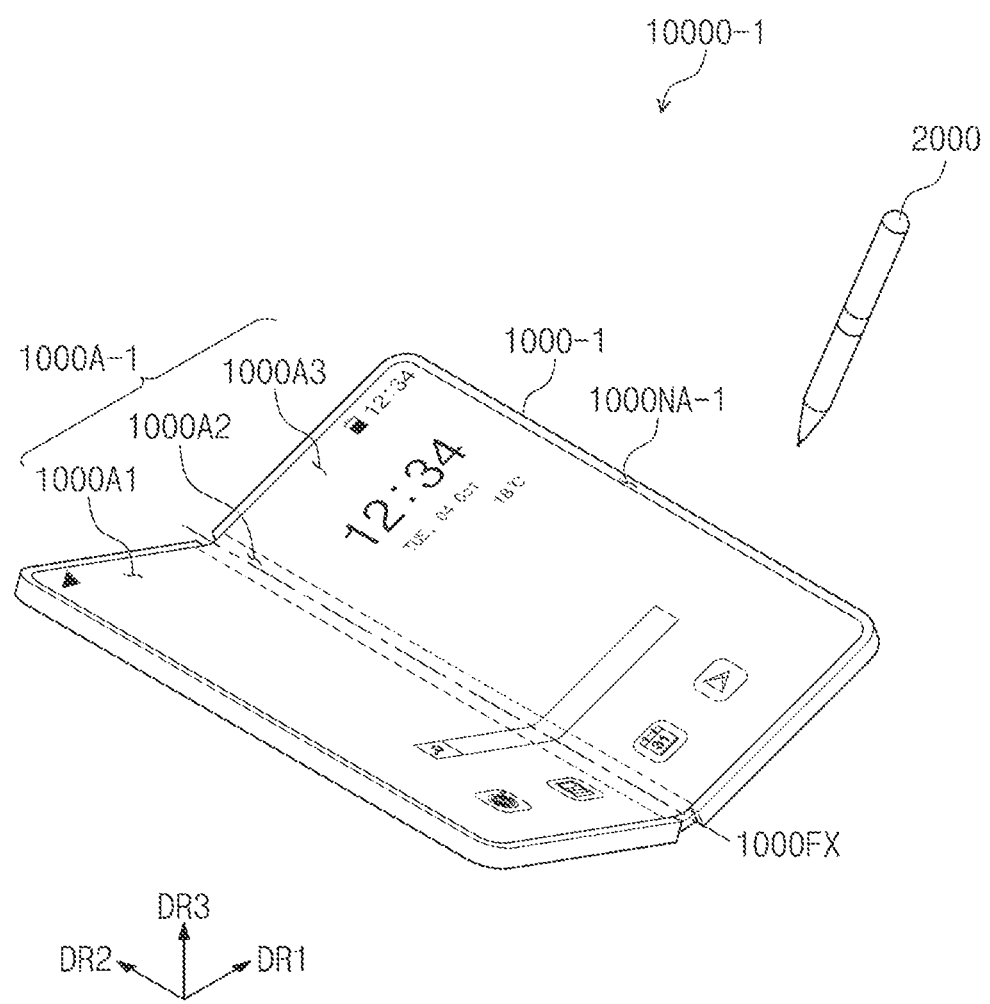
FIG. 1B is a perspective view illustrating an interface device, according to some embodiments of the present disclosure.

FIG. 1B is a perspective view illustrating an interface device, according to some embodiments of the present disclosure. In the description of FIG. 1B, the same reference numerals are assigned to the same components described with reference to FIG. 1A, and thus the descriptions thereof are omitted to avoid redundancy.

Referring to FIG. 1B, an interface device 10000-1 may include an electronic device 1000-1 and the input device 2000. In FIG. 1B, it is illustrated that the electronic device 1000-1 is folded at an angle (e.g., a set or predetermined angle). An active area 1000A-1 may include (or be parallel to) a plane defined by the first direction DR1 and the second direction DR2, in a state where the electronic device 1000-1 is unfolded.

The active area 1000A-1 may include a first area 1000A1, a second area 1000A2, and a third area 1000A3. The first area 1000A1, the second area 1000A2, and the third area 1000A3 may be sequentially defined in the first direction DR1. The second area 1000A2 may be bent about a folding axis 1000FX extending in the second direction DR2. Accordingly, the first area 1000A1 and the third area 1000A3 may be referred to as "non-folding areas", and the second area 1000A2 may be referred to as a "folding area".

When the electronic device 1000-1 is folded, the first area 1000A1 and the third area 1000A3 may face each other. Accordingly, while the electronic device 1000-1 is fully folded, the active area 1000A-1 may not be exposed to the outside, which may be referred to as "in-folding". However, this is an example. For example, an operation of the electronic device 1000-1 is not limited thereto.

For example, when the electronic device 1000-1 according to some embodiments of the present disclosure is folded, the first area 1000A1 and the third area 1000A3 may be opposed to each other. Accordingly, in a state where the electronic device 1000-1 is folded, the active area 1000A-1 may be exposed to the outside, which may be referred to as "out-folding".

The electronic device 1000-1 may perform only one of an in-folding operation or an out-folding operation. Alternatively, the electronic device 1000-1 may perform both an in-folding operation and an out-folding operation. In this case, the same area of the electronic device 1000-1, for example, the second area 1000A2 may be in-folded and out-folded.

One folding area and two non-folding areas are illustrated in FIG. 1B, but the number of folding areas and the number of non-folding areas are not limited thereto. For example, the electronic device 1000-1 may include a plurality of non-folding areas, of which the number is greater than two, and a plurality of folding areas interposed between non-folding areas adjacent to one another.

FIG. 1B illustrates that the folding axis 1000FX extends in the second direction DR2, but the present disclosure is not limited thereto. For example, the folding axis 1000FX may extend in a direction parallel to the first direction DR1. In this case, the first area 1000A1, the second area 1000A2, and the third area 1000A3 may be sequentially arranged in the second direction DR2.

The electronic device 1000-1 and the input device 2000 may be capable of bidirectional communication. The electronic device 1000-1 may provide an uplink signal to the input device 2000. The input device 2000 may provide a downlink signal to the electronic device 1000-1. The electronic device 1000-1 may detect the coordinates or slope of the input device 2000 by using the signal provided from the input device 2000.

Figure 2:
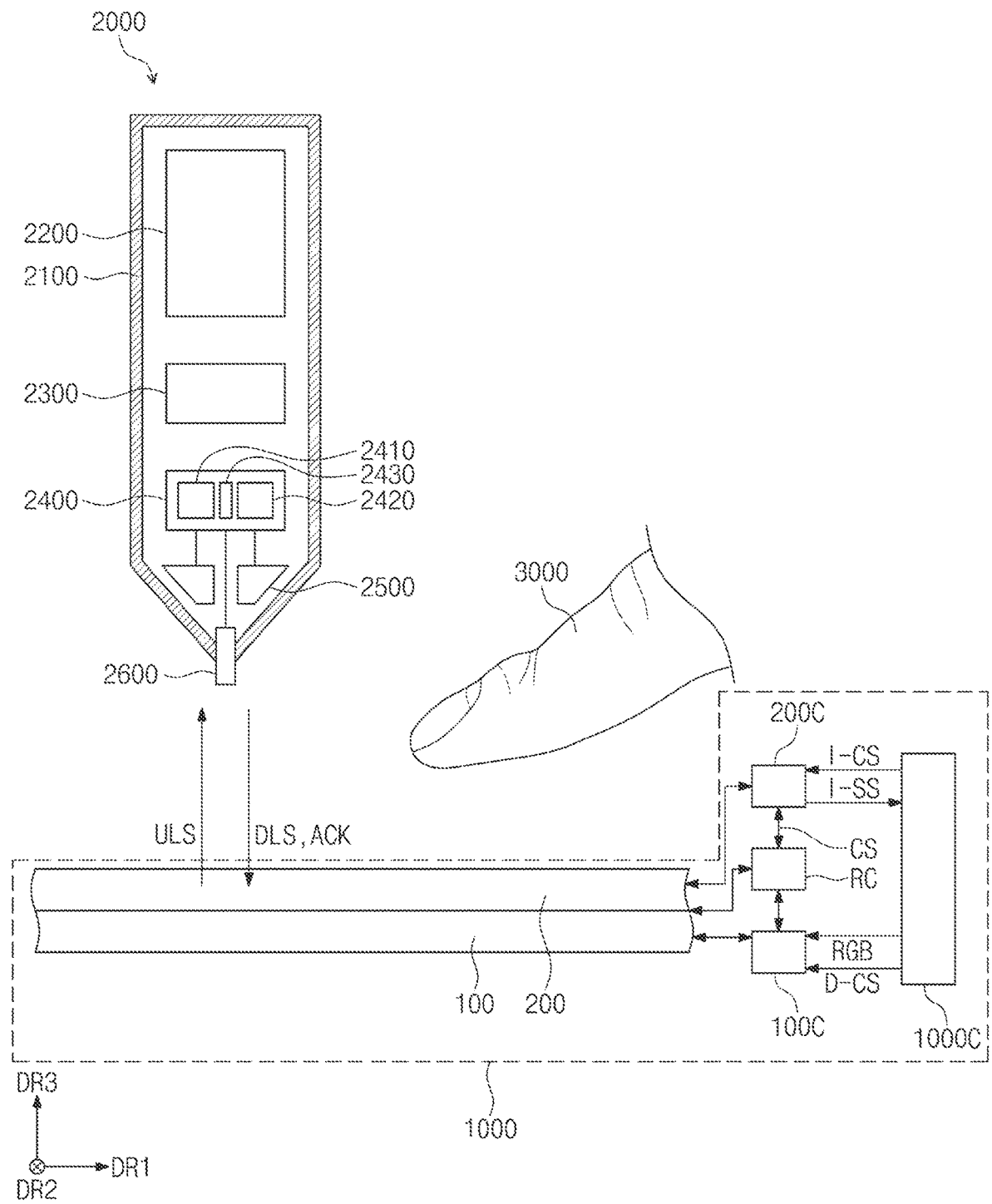
FIG. 2 is a block diagram schematically illustrating an electronic device and an input device, according to some embodiments of the present disclosure.

FIG. 2 is a block diagram schematically illustrating an electronic device and an input device, according to some embodiments of the present disclosure.

Referring to FIG. 2, the electronic device 1000 may include a display layer 100, a sensor layer 200, a driving controller 100C, a sensor controller 200C, a fingerprint controller RC, and a main controller 1000C.

The display layer 100 may be a component that substantially generates an image. The display layer 100 may be a light emitting display layer. For example, the display layer 100 may be an organic light emitting display layer, a quantum dot display layer, a micro-LED display layer, or a nano-LED display layer.

The sensor layer 200 may be located on the display layer 100. The sensor layer 200 may sense an external input applied from the outside. The sensor layer 200 may detect a first input by the input device 2000 and a second input by a user's body 3000.

The main controller 1000C may control the overall operation of the electronic device 1000. For example, the main controller 1000C may control operations of the driving controller 100C and the sensor controller 200C. However, this is an example. An operation of the main controller 1000C according to some embodiments of the present disclosure is not limited thereto. For example, the main controller 1000C may further control the fingerprint controller RC. The main controller 1000C may include at least one microprocessor, and the main controller 1000C may be referred to as a "host".

The driving controller 100C may control the display layer 100. The main controller 1000C may further include a graphic controller. The driving controller 100C may receive image data RGB and a control signal D-CS from the main controller 1000C. The control signal D-CS may include various signals. For example, the control signal D-CS may include an input vertical synchronization signal, an input horizontal synchronization signal, a main clock, and a data enable signal. The driving controller 100C may generate a vertical synchronization signal and a horizontal synchronization signal for controlling timing for providing a signal to the display layer 100, based on the control signal D-CS.

The fingerprint controller RC may control a plurality of sensors FX (see FIG. 4) in the display layer 100. The fingerprint controller RC may obtain a first input by the input device 2000 through the plurality of sensors FX (see FIG. 4). The fingerprint controller RC may obtain a second input by biometric information of a user's body 3000 through the plurality of sensors FX (see FIG. 4). For example, the biometric information may include a fingerprint.

The fingerprint controller RC and the driving controller 100C may communicate with each other. However, this is an example, and the driving of the fingerprint controller RC according to some embodiments of the present disclosure is not limited thereto. For example, the fingerprint controller RC may directly communicate with the main controller 1000C without communicating with the driving controller 100C.

The sensor controller 200C may control the sensor layer 200. The sensor controller 200C may receive a control signal I-CS from the main controller 1000C. The control signal I-CS may control the driving of the sensor controller 200C.

The sensor controller 200C may provide an uplink signal ULS to the input device 2000 through the sensor layer 200. The sensor controller 200C may detect a downlink signal DLS and an acknowledgment signal ACK from the input device 2000.

The sensor controller 200C may sense a touch by the body 3000 of the user. The sensor controller 200C may calculate coordinate information of an input by the touch based on a signal received from the sensor layer 200 and may provide the main controller 1000C with a coordinate signal I-SS including the coordinate information of the input by the touch. The main controller 1000C may execute an operation corresponding to a user input based on the coordinate signal I-SS. For example, the main controller 1000C may operate the driving controller 100C such that a new application image is displayed on the display layer 100 based on the coordinate signal I-SS.

The fingerprint controller RC and the sensor controller 200C may communicate with each other.

When receiving the acknowledgment signal ACK through the sensor layer 200, the sensor controller 200C may transmit a control signal CS to the fingerprint controller RC.

The control signal CS may be a signal for waking up the fingerprint controller RC. The fingerprint controller RC thus waiting may be activated through the control signal CS. The activated fingerprint controller RC may obtain a first input by the input device 2000 and/or a second input by biometric information of the user's body 3000 from the plurality of sensors FX (see FIG. 4).

Figure 4:
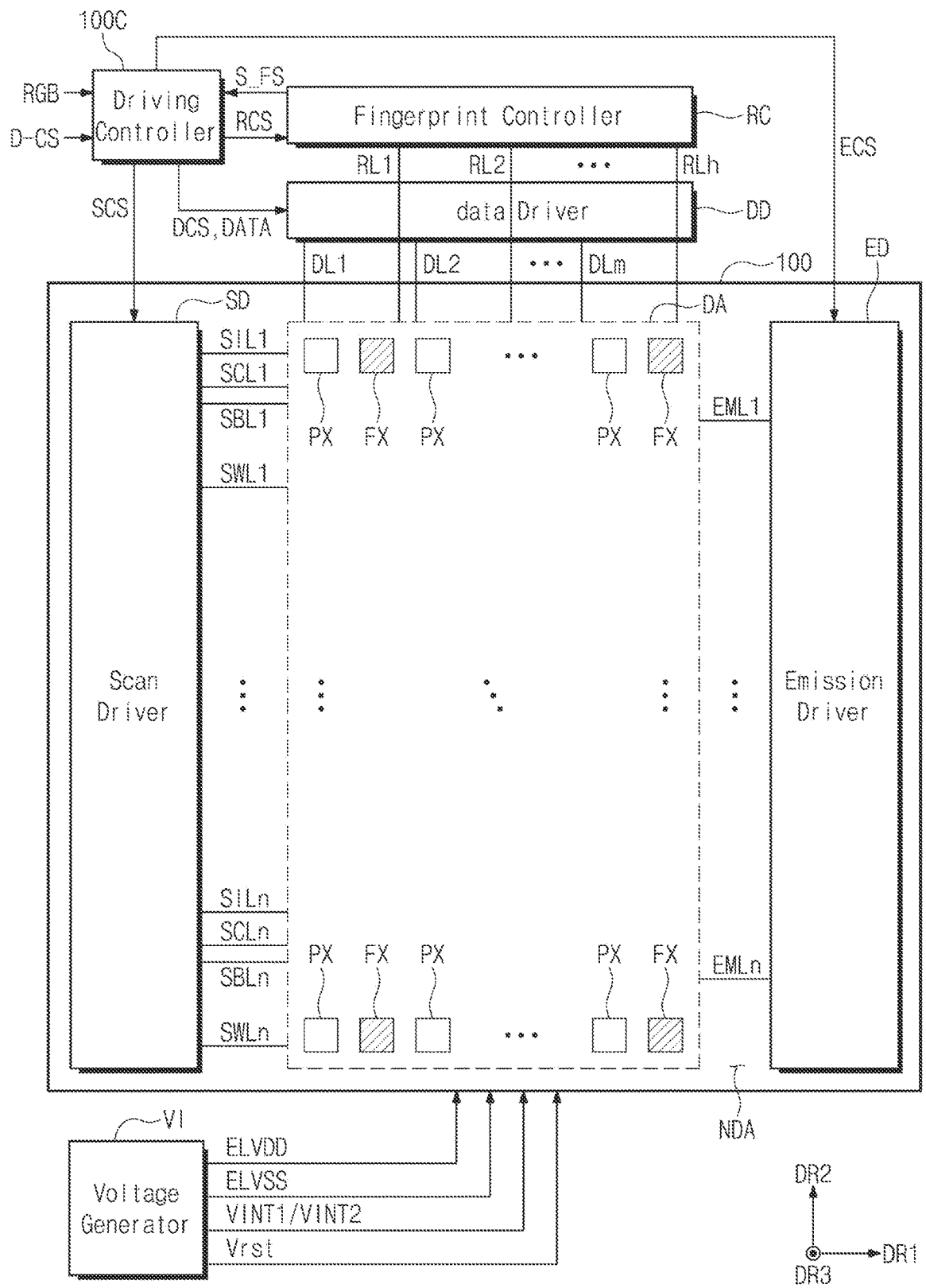
FIG. 4 is a block diagram of an electronic device, according to some embodiments of the present disclosure.

The fingerprint controller RC may provide the sensor controller 200C with information of the first input sensed by the plurality of sensors FX (see FIG. 4).

The sensor controller 200C may calculate coordinate information of the first input based on the information received from the fingerprint controller RC. The coordinate signal I-SS may further include coordinate information of the first input of the input device 2000.

The input device 2000 may include housing 2100, a power source 2200, a controller 2300, a communication module 2400, a pen electrode 2500, and a light output unit 2600. However, components constituting the input device 2000 are not limited to the listed components. For example, the input device 2000 may further include an electrode switch for switching an operating mode to a signal transmission mode or a signal reception mode, a pressure sensor for sensing pressure, a memory for storing information (e.g., set or predetermined information), or a rotation sensor for sensing rotation.

The housing 2100 may have a pen shape, and an accommodation space may be formed in the housing 2100. The power source 2200, the controller 2300, the communication module 2400, and the pen electrode 2500 may be accommodated in the accommodation space defined inside the housing 2100.

The power source 2200 may supply a power source to the controller 2300 and the communication module 2400 inside the input device 2000. The power source 2200 may include a battery or a high capacity capacitor.

The controller 2300 may control the operation of the input device 2000. The controller 2300 may be an application-specific integrated circuit (ASIC). The controller 2300 may be configured to operate depending on a designed program.

The controller 2300 may generate the downlink signal DLS according to a protocol (e.g., a set or predetermined protocol). The protocol (e.g., the set or predetermined protocol) may include a universal stylus initiative (USI). However, this is an example. The protocol (e.g., the set or predetermined protocol) according to some embodiments of the present disclosure is not limited thereto. For example, the protocol (e.g., the set or predetermined protocol) may include an active electrostatic method protocol (AES) or a Microsoft pen protocol (MPP).

The communication module 2400 may include a first transmission circuit 2410, a reception circuit 2420, and a second transmission circuit 2430. The plurality of downlink signals DLS may be provided.

The first transmission circuit 2410 may output the acknowledgment signal ACK and at least one of the plurality of downlink signals DLS to the sensor layer 200. The first downlink signal may be a frequency signal.

The reception circuit 2420 may receive the uplink signal ULS provided from the sensor layer 200. For example, the uplink signal ULS may have the frequency of 500 kilohertz (kHz).

The second transmission circuit 2430 may output another one of the plurality of downlink signals DLS to a sensing element OPD (see FIG. 6) of each of the plurality of sensors FX (see FIG. 4). The other one of the plurality of downlink signals DLS may be an optical signal. The optical signal may include infrared light. That is, the second transmission circuit 2430 may transmit infrared light to the sensing element OPD (see FIG. 6). That is, the first input by the input device 2000 may include infrared light.

The first transmission circuit 2410 and the second transmission circuit 2430 may receive a signal provided from the controller 2300 and may modulate the signal into a signal capable of being sensed by the electronic device 1000. The reception circuit 2420 may modulate a signal provided from the sensor layer 200 into a signal processable by the controller 2300.

The pen electrode 2500 may be electrically connected to the communication module 2400. The pen electrode 2500 may transmit the at least one of the plurality of downlink signals DLS. The pen electrode 2500 may be positioned along the outer surface of the housing 2100.

The light output unit 2600 may be electrically connected to the communication module 2400. The light output unit 2600 may transmit the other one of the plurality of downlink signals DLS. A portion of the light output unit 2600 may protrude from the housing 2100. Alternatively, the input device 2000 may further include cover housing for covering the light output unit 2600 exposed from the housing 2100. Alternatively, the light output unit 2600 may be embedded in the housing 2100.

Figure 3A:
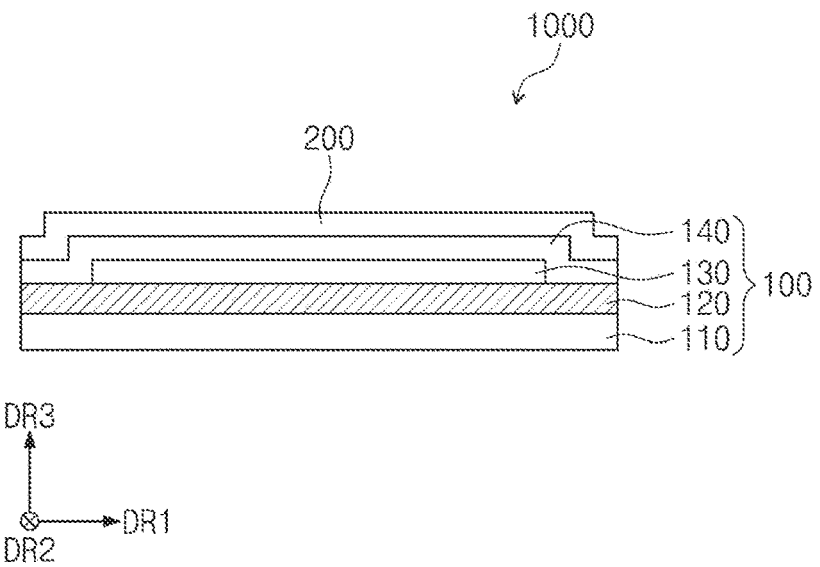
FIG. 3A is a cross-sectional view of an electronic device, according to some embodiments of the present disclosure.

FIG. 3A is a cross-sectional view of an electronic device, according to some embodiments of the present disclosure.

Referring to FIG. 3A, the electronic device 1000 may include the display layer 100 and the sensor layer 200. The display layer 100 may include a base layer 110, a circuit layer 120, a light emitting element layer 130, and an encapsulation layer 140.

The base layer 110 may be a member that provides a base surface on which the circuit layer 120 is located. The base layer 110 may be a glass substrate, a metal substrate, or a polymer substrate. However, embodiments according to the present disclosure are not limited thereto, and the base layer 110 may be an inorganic layer, an organic layer, or a composite material layer.

The base layer 110 may have a multi-layer structure. For example, the base layer 110 may include a first synthetic resin layer, a silicon oxide (SiOx) layer located on the first synthetic resin layer, an amorphous silicon (a-Si) layer located on the silicon oxide layer, and a second synthetic resin layer located on the amorphous silicon layer. The silicon oxide layer and the amorphous silicon layer may be referred to as a "base barrier layer".

Each of the first and second synthetic resin layers may include polyimide-based resin. Also, each of the first and second synthetic resin layers may include at least one of acrylate-based resin, methacrylate-based resin, polyisoprene-based resin, vinyl-based resin, epoxy-based resin, urethane-based resin, cellulose-based resin, siloxane-based resin, polyamide-based resin, or perylene-based resin. In the meantime, "~~"-based resin in the specification means including the functional group of "~~".

The circuit layer 120 may be located on the base layer 110. The circuit layer 120 may include an insulating layer, a semiconductor pattern, a conductive pattern, and a signal line. The insulating layer, the semiconductor layer, and the conductive layer may be formed on the base layer 110 in a manner such as coating, evaporation, or the like. Afterward, the insulating layer, the semiconductor layer, and the conductive layer may be selectively patterned by performing a photolithography process multiple times. Afterward, the semiconductor pattern, the conductive pattern, and the signal line included in the circuit layer 120 may be formed.

The light emitting element layer 130 may be located on the circuit layer 120. The light emitting element layer 130 may include a light emitting element. For example, the light emitting element layer 130 may include an organic light emitting material, a quantum dot, a quantum rod, a micro-LED, or a nano-LED.

The encapsulation layer 140 may be located on the light emitting element layer 130. The encapsulation layer 140 may protect the light emitting element layer 130 from foreign substances such as moisture, oxygen, and dust particles.

The sensor layer 200 may be formed on the display layer 100 through a successive process. In this case, the sensor layer 200 may be expressed as being directly located on the display layer 100. "Being directly located" may mean that the third component is not interposed between the sensor layer 200 and the display layer 100. That is, a separate adhesive member may not be interposed between the sensor layer 200 and the display layer 100. Alternatively, the sensor layer 200 may be coupled to the display layer 100 through an adhesive member. The adhesive member may include a common adhesive or a common sticking agent.

Figure 3B:
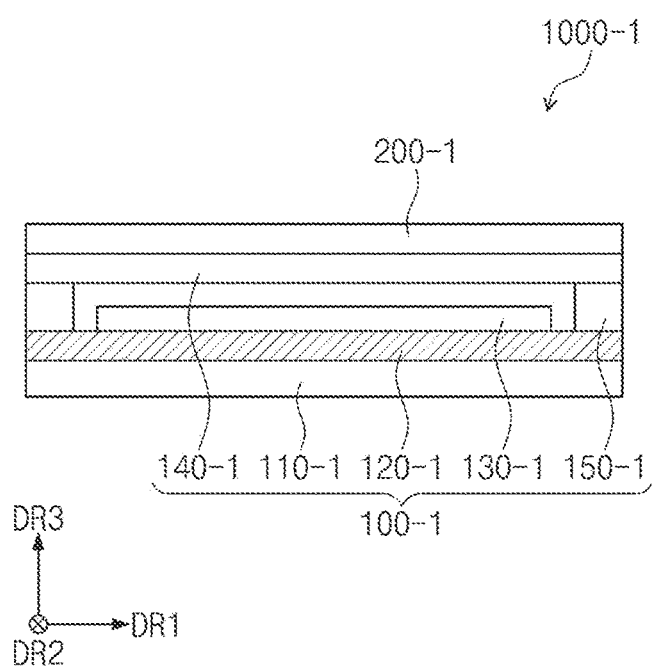
FIG. 3B is a cross-sectional view of an electronic device, according to some embodiments of the present disclosure.

FIG. 3B is a cross-sectional view of an electronic device, according to some embodiments of the present disclosure.

Referring to FIG. 3B, the electronic device 1000-1 may include a display layer 100-1 and a sensor layer 200-1. The display layer 100-1 may include a base substrate 110-1, a circuit layer 120-1, a light emitting element layer 130-1, an encapsulation substrate 140-1, and a coupling member 150-1.

Each of the base substrate 110-1 and the encapsulation substrate 140-1 may be a glass substrate, a metal substrate, a polymer substrate, or the like, but is not particularly limited thereto.

The coupling member 150-1 may be interposed between the base substrate 110-1 and the encapsulation substrate 140-1. The coupling member 150-1 may couple the encapsulation substrate 140-1 to the base substrate 110-1 or the circuit layer 120-1. The coupling member 150-1 may include an inorganic material or an organic material. For example, the inorganic material may include a frit seal, and the organic material may include a photo-curable resin or a photo-plastic resin. However, the material constituting the coupling member 150-1 is not limited to the example.

The sensor layer 200-1 may be directly located on the encapsulation substrate 140-1. "Being directly located" may mean that the third component is not interposed between the sensor layer 200-1 and the encapsulation substrate 140-1. That is, a separate adhesive member may not be interposed between the sensor layer 200-1 and the display layer 100-1. However, embodiments according to the present disclosure are not limited thereto, and an adhesive layer may be further interposed between the sensor layer 200-1 and the encapsulation substrate 140-1.

FIG. 4 is a block diagram of an electronic device, according to some embodiments of the present disclosure.

Referring to FIG. 4, the electronic device 1000 (see FIG. 1A) may include the display layer 100, the driving controller 100C, a data driver DD, a scan driver SD, an emission driver ED, a voltage generator VI, and the fingerprint controller RC.

The driving controller 100C may receive the image data RGB and the control signal D-CS. The driving controller 100C may generate image data signal DATA obtained by converting the data format of the image data RGB so as to be suitable for the interface specification of the data driver DD. The driving controller 100C may output a first control signal SCS, a second control signal ECS, a third control signal DCS, and a fourth control signal RCS.

The scan driver SD may receive the first control signal SCS from the driving controller 100C. The scan driver SD may output scan signals to scan lines SILn, SCLn, SBLn, and SWLn in response to the first control signal SCS. The scan lines SILn, SCLn, SBLn, and SWLn may include initialization scan lines SIL1 to SILn, compensation scan lines SCL1 to SCLn, write scan lines SWL1 to SWLn, and black scan lines SBL1 to SBLn.

The emission driver ED may receive the second control signal ECS from the driving controller 100C. The emission driver ED may output emission control signals to emission control lines EML1 to EMLn in response to the second control signal ECS.

The data driver DD may receive the third control signal DCS and the image data signal DATA from the driving controller 100C. The data driver DD may convert the image data signal DATA into data signals and may output the data signals to data lines DL1 to DLm. The data signals may be analog voltages corresponding to grayscale values of the image data signal DATA.

The voltage generator VI may generate voltages necessary for the operation of the display layer 100. According to some embodiments, the voltage generator VI may generate a first driving voltage ELVDD, a second driving voltage ELVSS, a first initialization voltage VINT1, a second initialization voltage VINT2, and a reset voltage Vrst. However, the voltage generated by the voltage generator VI is not limited thereto.

The display layer 100 may include a plurality of pixels PX located in a display area DA and the plurality of sensors FX located in the display area DA. When viewed from above a plane (e.g., in a plan view), the display area DA of the display layer 100 may overlap the active area 1000A (see FIG. 1A) of the electronic device 1000 (see FIG. 1A). According to some embodiments of the present disclosure, each of the plurality of sensors FX may be interposed between the two pixels PX adjacent to each other. The pixels PX and the sensors FX may be alternately positioned in the first and second directions DR1 and DR2. However, embodiments according to the present disclosure are not necessarily limited thereto. For example, the two or more pixels PX may be positioned between the two sensors FX, which are adjacent to each other, from among the sensors FX in the first direction DR1, and the two or more pixels PX may be positioned between the two sensors FX, which are adjacent to each other, from among the sensors FX in the second direction DR2. The plurality of sensors FX may be located on the whole surface of the display area DA.

The initialization scan lines SIL1 to SILn, the compensation scan lines SCL1 to SCLn, the write scan lines SWL1 to SWLn, the black scan lines SBL1 to SBLn, and the emission control lines EML1 to EMLn may extend in the first direction DR1 and may be spaced from each other in the second direction DR2. The data lines DL1 to DLm and readout lines RL1 to RLh may extend in the second direction DR2 and may be spaced from each other in the first direction DR1.

The plurality of pixels PX may be electrically connected to the initialization scan lines SIL1 to SILn, the compensation scan lines SCL1 to SCLn, the write scan lines SWL1 to SWLn, the black scan lines SBL1 to SBLn, the emission control lines EML1 to EMLn, and the data lines DL1 to DLm. Each of the plurality of pixels PX is electrically connected to four scan lines. However, the number of scan lines connected to each of the pixels PX is not limited thereto. For example, the number of scan lines may be changed.

The plurality of sensors FX may be electrically connected to the write scan lines SWL1 to SWLn and the readout lines RL1 to RLh. It is illustrated that each of the plurality of sensors FX is electrically connected to one scan line, but is not limited thereto. For example, the number of scan lines connected to each of the sensors FX may be changed. The number of the readout lines RL1 to RLh may be less than or equal to the number of the data lines DL1 to DLm. For example, the number of the readout lines RL1 to RLh may correspond to ½, ¼, or ⅛ of the number of the data lines DL1 to DLm.

The scan driver SD may be positioned in a non-display area NDA of the display layer 100. In response to the first control signal SCS received from the driving controller 100C, the scan driver SD may output initialization scan signals to the initialization scan lines SIL1 to SILn and may output compensation scan signals to the compensation scan lines SCL1 to SCLn. Furthermore, in response to the first control signal SCS, the scan driver SD may output write scan signals to the write scan lines SWL1 to SWLn and may output black scan signals to the black scan lines SBL1 to SBLn. According to some embodiments, the scan driver SD may include a first scan driver outputting initialization scan signals and compensation scan signals, and a second scan driver outputting write scan signals and black scan signals. However, embodiments according to the present disclosure are not limited thereto.

The emission driver ED may be positioned in the non-display area NDA of the display layer 100. The emission driver ED may output emission control signals to the emission control lines EML1 to EMLn in response to the second control signal ECS received from the driving controller 100C. According to some embodiments, the scan driver SD and the emission driver ED are shown to be distinguished, but are not limited thereto. For example, the scan driver SD is connected to the emission control lines EML1 to EMLn to output emission control signals, and the emission driver ED may be omitted.

The fingerprint controller RC may receive first sensing signals from the readout lines RL1 to RLh in response to the fourth control signal RCS received from the driving controller 100C. The fingerprint controller RC may process the first sensing signals received from the readout lines RL1 to RLh and may provide the processed first sensing signals S_FS to the driving controller 100C. The driving controller 100C may recognize biometric information based on the first sensing signals S_FS.

According to some embodiments of the present disclosure, the biometric information may be recognized in all areas of the display area DA through the plurality of sensors FX positioned on the whole surface of the display area DA. Accordingly, the electronic device 1000 (see FIG. 1A) having improved reliability may be provided.

Alternatively, the fingerprint controller RC may receive second sensing signals from the readout lines RL1 to RLh in response to the control signal CS (see FIG. 2) received from the sensor controller 200C (see FIG. 2). The fingerprint controller RC may process second sensing signals received from the readout lines RL1 to RLh and may provide the processed second sensing signals to the sensor controller 200C (see FIG. 2). The sensor controller 200C (see FIG. 2) may recognize coordinate information of the input device 2000 (see FIG. 2) based on the second sensing signals.

Figure 5:
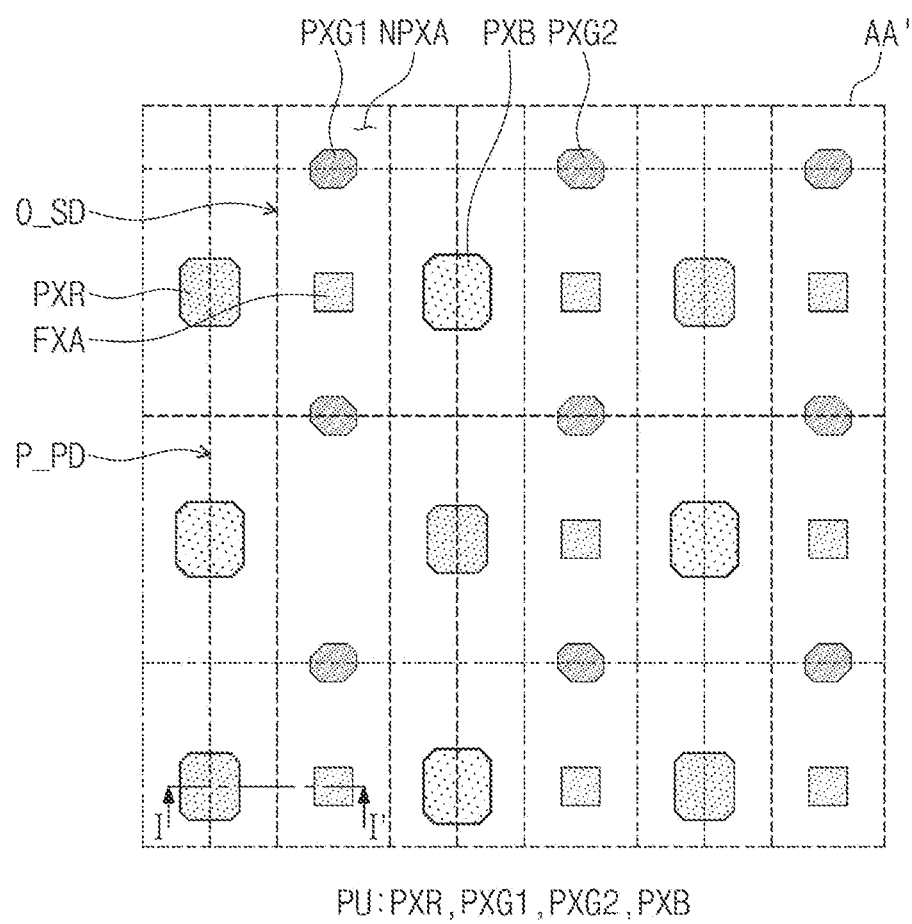
FIG. 5 is an enlarged plan view obtained by enlarging an area AA' of FIG. 1, according to some embodiments of the present disclosure.
Figure 5:
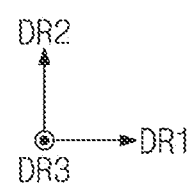

FIG. 5 is an enlarged plan view obtained by enlarging an area AA' of FIG. 1, according to some embodiments of the present disclosure.

Referring to FIG. 5, the display area DA may include a plurality of pixel areas PXR, PXG1, PXG2, and PXB, a plurality of light receiving areas FXA, and a peripheral area NPXA. The peripheral area NPXA may surround the pixel areas PXR, PXG1, PXG2, and PXB and the light receiving areas FXA, and may set boundaries thereof.

Each of the pixel areas PXR, PXG1, PXG2, and PXB may correspond to an area where a light emitting element OLED (see FIG. 6) is arranged. Each of the light receiving areas FXA may correspond to an area where a sensing element OPD (see FIG. 6) is arranged. The pixel areas PXR, PXG1, PXG2, and PXB may include the first pixel areas PXR, the second pixel areas PXG1 and PXG2, and the third pixel areas PXB. The first to third pixel areas PXR, PXG1, PXG2, and PXB may be classified depending on the color of emitted light. For example, each of the first pixel areas PXR may output first color light; each of the second pixel areas PXG1 and PXG2 may output second color light different from the first color light; and, each of the third pixel areas PXB may output third color light different from the first light and the second color light. For example, the first color light, the second color light, and the third color light may be red light, green light, and blue light, respectively, but embodiments according to the present disclosure are not necessarily limited thereto.

The pixel areas PXR, PXG1, PXG2, and PXB may be grouped into pixel units PU. According to some embodiments, it is illustrated that each of the pixel units PU includes the one first pixel area PXR, the two second pixel areas PXG1 and PXG2, and the one third pixel area PXB. However, the number of pixel areas constituting the pixel unit PU is not limited thereto.

The first pixel area PXR and the third pixel area PXB may be alternately and repeatedly arranged in the first direction DR1 and the second direction DR2. The second pixel areas PXG1 and PXG2 may be arranged in the first direction DR1 and the second direction DR2. In the first direction DR1 and the second direction DR2, the second pixel areas PXG1 and PXG2 may be arranged in different rows and different columns from the first pixel area PXR and the third pixel area PXB.

Each of the second pixel areas PXG1 and PXG2 may have a smaller area than each of the first pixel area PXR and the third pixel area PXB. The first pixel area PXR may have a smaller area than the third pixel area PXB. However, it is not limited thereto, and the first pixel area PXR and the third pixel area PXB may have the same area as each other, or all of the first to third pixel areas PXR, PXG1, PXG2, and PXB may have the same area as one another.

The first to third pixel areas PXR, PXG1, PXG2, and PXB may have different shapes from one another. For example, each of the first pixel area PXR and the third pixel area PXB may have an octagonal shape extending in the first direction DR1, and the second pixel areas PXG1 and PXG2 may have an octagonal shape extending in the second direction DR2 different from the extension direction of the first pixel area PXR. Some of the second pixel areas PXG1 and PXG2 may have symmetrical shapes. However, shapes of the first to third pixel areas PXR, PXG1, PXG2, and PXB are not limited to the illustration of FIG. 5. For example, the first to third pixel areas PXR, PXG1, PXG2, and PXB may have various shapes such as an ellipse, a circle, and a rectangle.

The light receiving areas FXA may be positioned in the first direction DR1 and the second direction DR2. The light receiving areas FXA may be positioned between the second pixel areas PXG1 and PXG2 in the second direction DR2, and the light receiving areas FXA may be positioned between the first pixel area PXR and the third pixel area PXB in the first direction DR1.

Each of the light receiving areas FXA has a rectangular shape on a plane (e.g., in a plan view), and may be smaller than each of the first to third pixel areas PXR, PXG1, PXG2, and PXB. However, embodiments according to the present disclosure are not necessarily limited thereto.

A pixel driving circuit P_PD connected to the light emitting element OLED (see FIG. 6) and a sensor driving circuit O_SD connected to the sensing element OPD (see FIG. 6) may be positioned in the display area DA. The pixel driving circuit P_PD may be arranged adjacent to the light emitting element OLED (see FIG. 6), and the sensor driving circuit O_SD may be arranged adjacent to the sensing element OPD (see FIG. 6).

Figure 6:
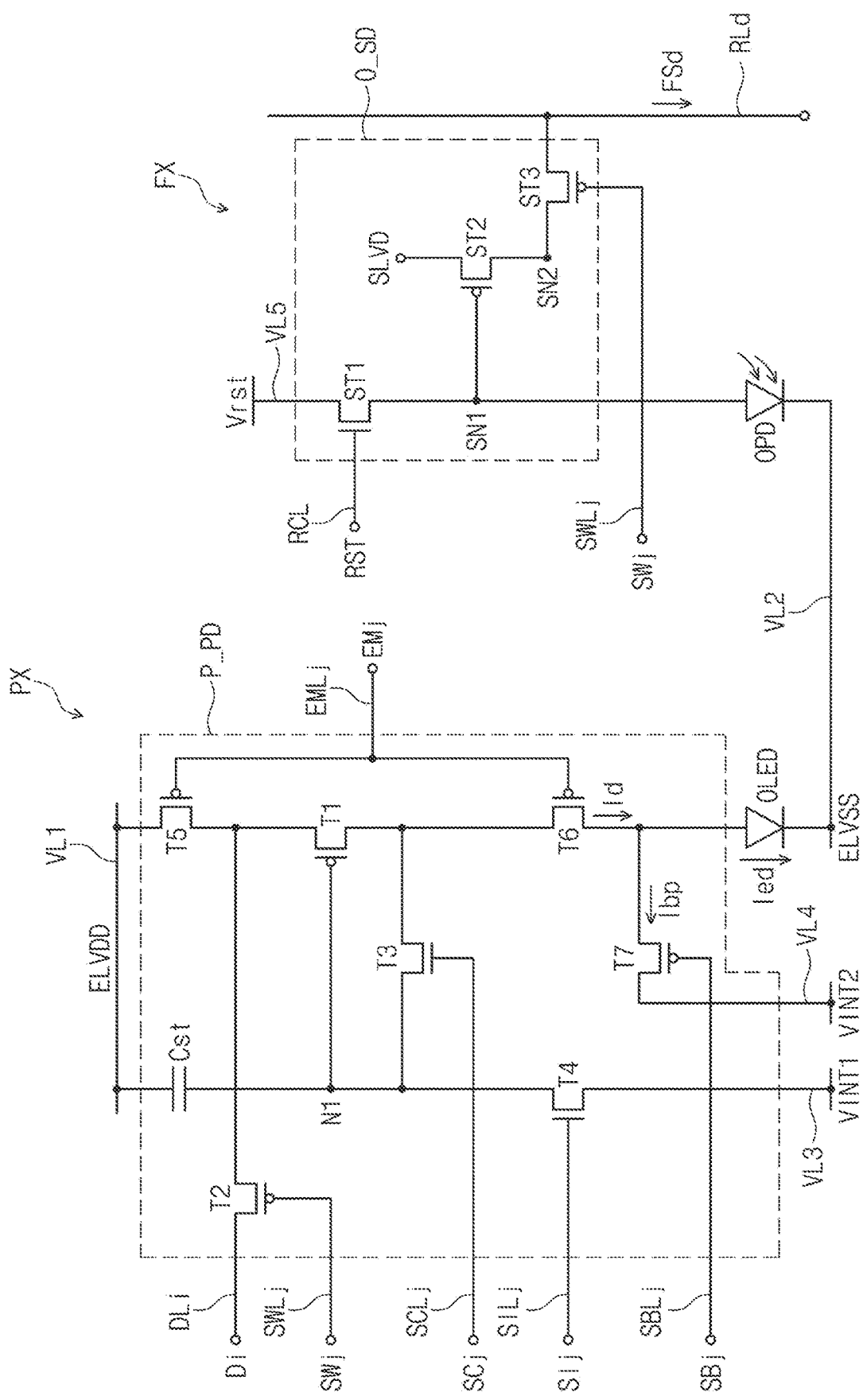
FIG. 6 is an equivalent circuit diagram of a pixel and a sensor, according to some embodiments of the present disclosure.

FIG. 6 is an equivalent circuit diagram of a pixel and a sensor, according to some embodiments of the present disclosure.

Referring to FIG. 4A, the pixel PX may be connected with the i-th data line DLi of the data lines DL1 to DLm, the j-th initialization scan line SILj of the initialization scan lines SIL1 to SILn, the j-th compensation scan line SCLj of the compensation scan lines SCL1 to SCLn, the j-th write scan line SWLj of the write scan lines SWL1 to SWLn, the j-th black scan line SBLj of the black scan lines SBL1 to SBLn, and the j-th emission control line EMLj of the emission control lines EML1 to EMLn. Here, each of 'i' and 'j' is a natural number.

The pixel PX may include the light emitting element OLED and the pixel driving circuit P_PD. The light emitting element OLED may be a light emitting diode. For example, the light emitting element OLED may be an organic light emitting diode including an organic light emitting layer. The pixel driving circuit P_PD may be connected to the light emitting element OLED to control the amount of current flowing through the light emitting element OLED. The light emitting element OLED may generate light having a luminance (e.g., a set or predetermined luminance) depending on the amount of supplied current.

The pixel driving circuit P_PD may include first to seventh transistors T1 to T7 and a capacitor Cst. Each of the first to seventh transistors T1 to T7 may be a transistor having a low-temperature polycrystalline silicon (LTPS) semiconductor layer or a transistor having an oxide semiconductor layer. Moreover, each of the first to seventh transistors T1 to T7 may be a P-type transistor or an N-type transistor. For example, the first, second, fifth, sixth, and seventh transistors T1, T2, T5, T6, and T7 may be PMOS transistors, each of which has the LTPS semiconductor layer, and the third and fourth transistors T3 and T4 may be NMOS transistors, each of which has an oxide semiconductor layer. However, this is only an example, and embodiments of the first to seventh transistors T1 to T7 are not limited thereto.

The j-th initialization scan line SILj, the j-th compensation scan line SCLj, the j-th write scan line SWLj, the j-th black scan line SBLj, and the j-th emission control line EMLj may deliver a j-th initialization scan signal SIj, a j-th compensation scan signal SCj, a j-th write scan signal SWj, a j-th black scan signal SBj, and a j-th emission control signal EMj to the pixel PX, respectively. The i-th data line DLi may deliver an i-th data signal Di to the pixel PX. The i-th data signal Di may have a voltage level corresponding to the image data RGB (see FIG. 4) input to the driving controller 100C (see FIG. 4).

First and second voltage lines VL1 and VL2 may deliver the first and second driving voltages ELVDD and ELVSS to the pixel PX, respectively. Moreover, third and fourth voltage lines VL3 and VL4 may deliver the first and second initialization voltages VINT1 and VINT2 to the pixel PX, respectively.

The light emitting element OLED may include a first electrode and a second electrode. The first electrode of the light emitting element OLED may be electrically connected to the first voltage line VL1 for receiving the first driving voltage ELVDD via at least one transistor. The second electrode of the light emitting element OLED may be electrically connected to the second voltage line VL2 for receiving the second driving voltage ELVSS. According to some embodiments, the first electrode of the light emitting element OLED may correspond to an anode electrode, and the second electrode of the light emitting element OLED may correspond to a cathode electrode.

Each of the first to seventh transistors T1 to T7 may include a first electrode, a second electrode, and a gate electrode. According to some embodiments of the present disclosure, the first electrode and the second electrode may be defined as an input electrode or an output electrode (or a source electrode or a drain electrode), respectively. Meanwhile, in this specification, "being electrically connected between a transistor and a signal line or between a transistor and a transistor" means that "an electrode of the transistor is integrated with a signal line or connected through a connection electrode".

The first transistor T1 may be electrically connected between the first voltage line VL1 for receiving the first driving voltage ELVDD and the light emitting element OLED. The first transistor T1 may include a first electrode connected to the first voltage line VL1 via the fifth transistor T5, a second electrode connected to the first electrode of the light emitting element OLED via the sixth transistor T6, and a gate electrode connected to one end of the capacitor Cst. The first transistor T1 may receive the data signal Di delivered through the data line DLi depending on the switching operation of the second transistor T2 and then may supply a driving current Id to the light emitting element OLED. According to some embodiments, the first transistor T1 may be defined as a driving transistor.

The second transistor T2 may be electrically connected between the data line DLi and the first electrode of the first transistor T1. The second transistor T2 may include a first electrode connected to the data line DLi, a second electrode connected to the first electrode of the first transistor T1, and a gate electrode connected to the j-th write scan line SWLj. The second transistor T2 may be turned on in response to the write scan signal SWj transferred through the j-th write scan line SWLj and then may transfer the data signal Di transferred from the data line DLi to the first electrode of the first transistor T1. According to some embodiments, the second transistor T2 may be defined as a switching transistor.

The third transistor T3 may be electrically connected between the second electrode of the first transistor T1 and a first node N1 connected to the gate electrode of the first transistor T1. The third transistor T3 may include a first electrode connected to the first node N1, a second electrode connected to the second electrode of the first transistor T1, and a gate electrode connected to the j-th compensation scan line SCLj. The third transistor T3 may be turned on in response to the j-th compensation scan signal SCj transferred through the j-th compensation scan line SCLj to connect the gate electrode of the first transistor T1 and the second electrode of the first transistor T1. In this case, the first transistor T1 may be diode-connected. According to some embodiments, the third transistor T3 may be defined as a compensation transistor.

The fourth transistor T4 may be electrically connected between the third voltage line VL3, to which the first initialization voltage VINT1 is supplied, and the first node N1. The fourth transistor T4 may include a first electrode connected to the third voltage line VL3, a second electrode connected to the first node N1, and a gate electrode connected to the j-th initialization scan line SILj. The fourth transistor T4 may be turned on in response to the j-th initialization scan signal SIj delivered through the j-th initialization scan line SILj to deliver the first initialization voltage VINT1 to the first node N1, and may initialize the potential of the gate electrode of the first transistor T1. According to some embodiments, the fourth transistor T4 may be defined as an initialization transistor.

The fifth transistor T5 may be electrically connected between the first voltage line VL1 and the first transistor T1. The fifth transistor T5 may include a first electrode connected to the first voltage line VL1, a second electrode connected to the first electrode of the first transistor T1, and a gate electrode connected to the j-th emission control line EMLj.

The sixth transistor T6 may be electrically connected between the first transistor T1 and the light emitting element OLED. The sixth transistor T6 may include a first electrode connected to the second electrode of the first transistor T1, a second electrode connected to the first electrode of the light emitting element OLED, and a gate electrode connected to the j-th emission control line EMLj.

The fifth transistor T5 and the sixth transistor T6 may be turned on in response to the emission control signal EMj delivered through the j-th emission control line EMLj. The emission time of the light emitting element OLED may be controlled by the emission control signal EMj. When the fifth transistor T5 and the sixth transistor T6 are turned on, the driving current Id according to a voltage difference between the gate voltage of the gate electrode of the first transistor T1 and the first driving voltage ELVDD may be generated and supplied to the light emitting element OLED through the sixth transistor T6, and thus the light emitting element OLED may emit light. According to some embodiments, the fifth transistor T5 and the sixth transistor T6 may be defined as emission control transistors.

The seventh transistor T7 may be electrically connected between the fourth voltage line VL4, to which the second initialization voltage VINT2 is supplied, and the sixth transistor T6. The seventh transistor T7 may include a first electrode connected to the fourth voltage line VL4, a second electrode connected to the second electrode of the sixth transistor T6, and a gate electrode connected to the j-th black scan line SBLj. According to some embodiments, the seventh transistor T7 may be defined as an initialization transistor.

The seventh transistor T7 may be turned on in response to the j-th black scan signal SBj delivered through the j-th black scan line SBLj. A part of the driving current Id may be drained through the seventh transistor T7 as a bypass current Ibp. When a black image is displayed, a current (i.e., a light emitting current Ied) that corresponds to a result of subtracting the bypass current Ibp flowing through the seventh transistor T7 from the driving current Id is provided to the light emitting element OLED, and thus a black image may be clearly displayed. That is, a contrast ratio of the electronic device 1000 (see FIG. 1A) may be improved by implementing an accurate black luminance image through the seventh transistor T7. According to some embodiments, the seventh transistor T7 may be turned on in response to the black scan signal SBj having a low level as a bypass signal, but is not necessarily limited thereto.

One end of the capacitor Cst may be connected to the gate electrode of the first transistor T1, and the other end of the capacitor Cst may be connected to the first voltage line VL1. Charges corresponding to a voltage difference between one end and the other end may be stored in the capacitor Cst. When the fifth transistor T5 and the sixth transistor T6 are turned on, the amount of current flowing to the first transistor T1 may be determined depending on the voltage stored in the capacitor Cst.

In the meantime, a configuration of the pixel driving circuit P_PD according to some embodiments of the present disclosure is not limited to the embodiments illustrated in FIG. 6. The configuration of the pixel driving circuit P_PD illustrated in FIG. 6 is only an example. For example, the configuration of the pixel driving circuit P_PD may be modified and implemented.

The sensor FX may be connected to a d-th readout line RLd among the readout lines RL1 to RLh, the j-th write scan line SWLj, and a reset control line RCL. Here, 'd' may be a natural number.

The sensor FX may include the sensing element OPD and the sensor driving circuit O_SD connected to the sensing element OPD. The sensing element OPD may be a photodiode. For example, the sensing element OPD may be an organic photodiode including an organic material as a photoelectric conversion layer. FIG. 6 shows the one sensing element OPD connected to the sensor driving circuit O_SD, but embodiments according to the present disclosure are not limited thereto. For example, the sensor FX may include a plurality of sensing elements connected in parallel to the sensor driving circuit O_SD.

The sensor driving circuit O_SD may include three transistors ST1 to ST3. The three transistors ST1 to ST3 may include the reset transistor ST1, the amplification transistor ST2, and the output transistor ST3. Each of the reset transistor ST1, the amplification transistor ST2, and the output transistor ST3 may be a transistor having an LTPS semiconductor layer or a transistor having an oxide semiconductor layer. Furthermore, each of the reset transistor ST1, the amplification transistor ST2, and the output transistor ST3 may be a P-type transistor or an N-type transistor. For example, the reset transistor ST1 may be an NMOS transistor having an oxide semiconductor layer, and each of the amplification transistor ST2 and the output transistor ST3 may be a PMOS transistor having an LTPS semiconductor layer. However, this is only an example. For example, the first to third transistors ST1 to ST3 included in the sensor driving circuit O_SD are not limited thereto.

The reset control line RCL may receive a reset control signal RST to deliver the reset control signal RST to the sensor FX, and a fifth voltage line VL5 may receive the reset voltage Vrst to deliver the reset voltage Vrst to the sensor FX.

The sensing element OPD may include a first electrode and a second electrode. The first electrode of the sensing element OPD may be connected to a first sensing node SN1, and the second electrode of the sensing element OPD may be connected to the second voltage line VL2 for receiving the second driving voltage ELVSS. The second electrode of the sensing element OPD may be electrically connected to the second electrode of the light emitting element OLED. For example, the second electrode of the sensing element OPD and the second electrode of the light emitting element OLED may be integrated with each other to form a common cathode electrode C_CE (see FIG. 7). According to some embodiments, the first electrode of the sensing element OPD may correspond to a sensing anode electrode, and the second electrode may correspond to a sensing cathode electrode.

Each of the transistors ST1 to ST3 of the sensor driving circuit O_SD may include a first electrode, a second electrode, and a gate electrode. According to some embodiments of the present disclosure, the first electrode and the second electrode may be defined as an input electrode or an output electrode (or a source electrode or a drain electrode), respectively.

The reset transistor ST1 may include a first electrode connected to the fifth voltage line VL5 for receiving the reset voltage Vrst, a second electrode connected to the first sensing node SN1, and a gate electrode connected to the reset control line RCL for receiving the reset control signal RST. The reset transistor ST1 may reset the potential of the first sensing node SN1 to the reset control signal RST in response to the reset control signal RST. The reset control signal RST may be a signal provided through the reset control line RCL. However, embodiments according to the present disclosure are not limited thereto. For example, the reset control signal RST may be the j-th compensation scan signal SCj supplied through the j-th compensation scan line SCLj. That is, according to some embodiments, the reset transistor ST1 may receive the j-th compensation scan signal SCj, which is supplied through the j-th compensation scan line SCLj, as the reset control signal RST.

As an example of the present disclosure, during the at least activation period of the reset control signal RST, the reset voltage Vrst may have a voltage level lower than the second driving voltage ELVSS. The reset voltage Vrst may be a DC voltage maintained at a voltage level lower than the second driving voltage ELVSS.

The amplification transistor ST2 may include a first electrode receiving a sensing driving voltage SLVD, a second electrode connected with a second sensing node SN2, and a gate electrode connected with the first sensing node SN1. The amplification transistor ST2 is turned on in response to the potential of the first sensing node SN1 to apply the sensing driving voltage SLVD to the second sensing node SN2.

The sensing driving voltage SLVD may correspond to one of the first driving voltage ELVDD, the first initialization voltage VINT1, and the second initialization voltage VINT2. When the sensing driving voltage SLVD corresponds to the first driving voltage ELVDD, the first electrode of the amplification transistor ST2 may be electrically connected with the first voltage line VL1. When the sensing driving voltage SLVD corresponds to the first initialization voltage VINT1, the first electrode of the amplification transistor ST2 may be electrically connected with the third voltage line VL3. When the sensing driving voltage SLVD corresponds to the second initialization voltage VINT2, the first electrode of the amplification transistor ST2 may be electrically connected with the fourth voltage line VL4.

The output transistor ST3 may include a first electrode connected to the second sensing node SN2, a second electrode connected to the d-th readout line RLd, and a third electrode for receiving an output control signal. The output transistor ST3 may deliver a sensing signal FSd to the readout line RLd in response to the output control signal. The output control signal may be the j-th write scan signal SWj supplied through the j-th write scan line SWLj. That is, the output transistor ST3 may receive the write scan signal SWj supplied from the write scan line SWLj as the output control signal.

During an emission period of the light emitting element OLED, the sensing element OPD of the sensor FX may be exposed to light output from the light emitting element OLED. When the user's body 3000 (see FIG. 2) touches a display surface of the electronic device 1000 (see FIG. 2), the sensing element OPD may generate photocharges corresponding to light reflected by a ridge of a fingerprint or a valley between ridges of the fingerprint. The amount of current flowing through the sensing element OPD may be changed by the generated photocharges.

Alternatively, the sensing element OPD of the sensor FX may be exposed to infrared light provided from the input device 2000. The sensing element OPD may generate photocharges corresponding to the infrared light. The amount of current flowing through the sensing element OPD may be changed by the generated photocharges.

The amplification transistor ST2 may be a source follower amplifier that generates a source-drain current in proportion to a potential of the first sensing node SN1 input to the gate electrode of the amplification transistor ST2. When the j-th write scan signal SWj having a low level is supplied to the output transistor ST3, the output transistor ST3 may be turned on, and the sensing signal FSd corresponding to a current flowing through the amplification transistor ST2 may be output to the readout line RLd.

During the next reset period, when the reset control signal RST of a high level is supplied through the reset control line RCL, the reset transistor ST1 may be turned on. The reset period may be defined as an activation period (i.e., a high-level period) of the reset control line RCL. However, embodiments according to the present disclosure are not limited thereto. For example, when the reset transistor ST1 is a PMOS transistor, the reset control signal RST of a low level may be supplied to the reset control line RCL during the reset period. During the reset period, the first sensing node SN1 may be reset to a potential corresponding to the reset voltage Vrst. When the next reset period ends, the sensing element OPD may generate photocharges corresponding to the received light, and the generated photocharges may be accumulated in the first sensing node SN1.

In the meantime, a configuration of the sensor driving circuit O_SD according to some embodiments of the present disclosure are not limited to the embodiments illustrated in FIG. 6. The configuration of the sensor driving circuit O_SD illustrated in FIG. 6 is only an example, and the configuration of the sensor driving circuit O_SD may be modified and implemented.

Figure 7:
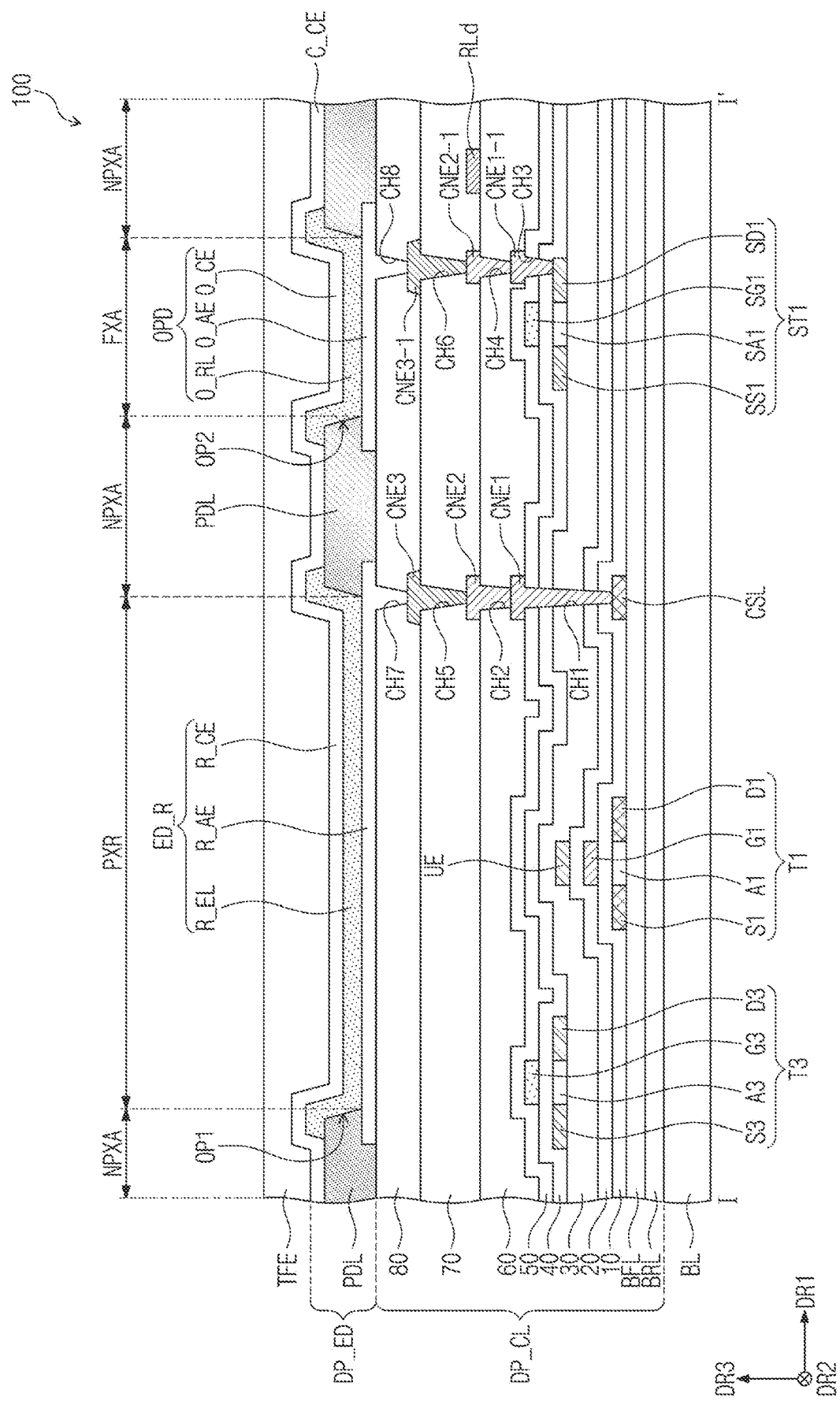
FIG. 7 is a cross-sectional view of a display layer taken along the line I-I' of FIG. 5, according to some embodiments of the present disclosure.

FIG. 7 is a cross-sectional view of a display layer taken along the line I-I' of FIG. 5, according to some embodiments of the present disclosure.

Referring to FIG. 7, the display layer 100 may include a base layer BL, a circuit layer DP_CL, an element layer DP_ED, and an encapsulation layer TFE.

The base layer BL may provide a base surface on which the circuit layer DP_CL is located. The base layer BL may include a synthetic resin layer. The synthetic resin layer may include a thermosetting resin. For example, the synthetic resin layer may include at least one of acrylate-based resin, methacrylate-based resin, polyisoprene, vinyl-based resin, epoxy-based resin, urethane-based resin, cellulose-based resin, siloxane-based resin, polyamide-based resin, or perylene-based resin. Besides, the base layer BL may include a glass substrate, a metal substrate, or an organic/inorganic composite substrate.

The circuit layer DP_CL may be located on the base layer BL. The circuit layer DP_CL may include the pixel driving circuit P_PD (see FIG. 6) included in the pixel PX (see FIG. 6) for displaying an image, and the sensor driving circuit O_SD (see FIG. 6) included in the sensor FX (see FIG. 6) for recognizing biometric information.

The circuit layer DP_CL may further include signal lines connected to the pixel driving circuit P_PD (see FIG. 6) or the sensor driving circuit O_SD (see FIG. 6).

The circuit layer DP_CL may include at least one insulating layer, a semiconductor pattern, and a conductive pattern, which constitute driving circuits. An insulating layer, a semiconductor layer, and a conductive layer may be formed on the base layer BL by coating or deposition. Afterward, the insulating layer, the semiconductor layer, and the conductive layer are patterned by photolithography to form the semiconductor pattern and the conductive pattern.

The circuit layer DP_CL may include a barrier layer BRL and/or a buffer layer BFL. The barrier layer BRL may prevent or reduce instances of foreign objects or contaminants entering from the outside. The barrier layer BRL may include a silicon oxide layer and a silicon nitride layer. According to some embodiments, the plurality of barrier layers BRL may be provided, and may include silicon oxide layers and silicon nitride layers that are alternately stacked with each other.

The buffer layer BFL may be located on the barrier layer BRL. The buffer layer BFL may improve a bonding force between the base layer BL and a semiconductor pattern and/or a conductive pattern. The buffer layer BFL may include a silicon oxide layer and a silicon nitride layer that are alternately stacked with each other.

The circuit layer DP_CL may include a first semiconductor pattern layer and a second semiconductor pattern layer that are located on different layers from each other. However, the cross section of the circuit layer DP_CL of the present disclosure is not limited thereto. For example, the cross section of the circuit layer DP_CL may vary depending on the structure of driving circuits.

The first semiconductor pattern layer of the circuit layer DP_CL may be located on the buffer layer BFL. For example, the first semiconductor pattern layer may be directly located on the buffer layer BFL. The first semiconductor pattern layer may include a silicon semiconductor. The first semiconductor pattern layer may include polysilicon or may include amorphous silicon, but is not limited thereto.

The first semiconductor pattern layer may include a plurality of areas having different electrical properties depending on whether the first semiconductor pattern layer is doped. The first semiconductor pattern layer may include a first area having high conductivity and a second area having low conductivity. The first area may be doped with an N-type dopant or a P-type dopant. The P-type transistor may include the doped area doped with a P-type dopant, and the N-type transistor may include the doped area doped with an N-type dopant. The second area may be an undoped area or an area doped with a concentration lower than a concentration in the first area.

The conductivity of the first area may be greater than that of the second area. The first area may substantially serve as a source electrode and drain electrode of a transistor, and the second area may substantially correspond to an active (or channel) of the transistor. In other words, in the first semiconductor pattern layer, the first area having high conductivity may be a source or drain of a transistor or a connection signal line, and a second area having low conductivity may be an active of the transistor.

A first source electrode S1, a first active A1, and a first drain electrode D1 of the first transistor T1 may be formed from the first semiconductor pattern layer. The first source electrode S1 and the first drain electrode D1 may extend in opposite directions to each other from the first active A1. According to some embodiments, the first source electrode S1, the first active A1, and the first drain electrode D1 of the first transistor T1 may be defined as the first semiconductor pattern. That is, the first semiconductor pattern layer may include the first semiconductor pattern.

The connection signal line CSL may be formed from the first semiconductor pattern layer and may be located on the buffer layer BFL. The connection signal line CSL may be electrically connected to the first semiconductor pattern of the first transistor T1 on a plane (e.g., in a plan view).

The circuit layer DP_CL may include a plurality of insulating layers located on the base layer BL. FIG. 7 illustrates first to eighth insulating layers 10 to 80 as an example of a plurality of insulating layers. However, the number of insulating layers of the circuit layer DP_CL is not limited thereto. For example, the number of insulating layers of the circuit layer DP_CL may vary depending on a configuration of forming the circuit layer DP_CL or a stack process.

Each of the first to eighth insulating layers 10 to 80 may be an inorganic layer and/or an organic layer, and may have a single layer or multi-layer structure. The inorganic layer may include at least one of aluminum oxide, titanium oxide, silicon oxide, silicon nitride, silicon oxynitride, zirconium oxide, or hafnium oxide. However, a material of the inorganic layer is not limited to the example. The organic layer may include at least one of acrylate-based resin, methacrylate-based resin, polyisoprene, vinyl-based resin, epoxy-based resin, urethane-based resin, cellulose-based resin, siloxane-based resin, polyamide-based resin, or perylene-based resin. However, a material of the organic layer is not limited to the example.

The first insulating layer 10 may be located on the buffer layer BFL. The first insulating layer 10 may overlap the pixels PX (see FIG. 4) in common to cover the first semiconductor pattern layer. That is, the first insulating layer 10 may cover the first semiconductor pattern of the first transistor T1 and the connection signal line CSL.

A first gate electrode G1 of the first transistor T1 may be located on the first insulating layer 10. The first gate electrode G1 may overlap the first active A1 on a plane (e.g., in a plan view). The first gate electrode G1 may function as a mask in a process of doping the first semiconductor pattern.

The second insulating layer 20 may be located on the first insulating layer 10 to cover the first gate electrode G1. An upper electrode UE may be located on the second insulating layer 20. The upper electrode UE may be a portion of a metal pattern or a portion of a doped semiconductor pattern. A portion of the first gate electrode G1 and the upper electrode UE overlapping the portion of the first gate electrode G1 may define the capacitor Cst (see FIG. 6) of the pixel PX (see FIG. 6). However, according to some embodiments, the upper electrode UE may be omitted.

According to some embodiments of the present disclosure, the second insulating layer 20 may be replaced with an insulating pattern. The upper electrode UE and the first gate electrode G1 may be spaced from each other with an insulating pattern interposed therebetween. In this case, the upper electrode UE may serve as a mask for forming an insulating pattern from the second insulating layer 20.

The third insulating layer 30 may be located on the second insulating layer 20 to cover the upper electrode UE. The second semiconductor pattern layer may be located on the third insulating layer 30. The second semiconductor pattern layer may be located on a layer different from the first semiconductor pattern layer described above.

The second semiconductor pattern layer may include an oxide semiconductor including metal oxide. The oxide semiconductor may include a crystalline oxide semiconductor or an amorphous oxide semiconductor. For example, the oxide semiconductor may include oxides of metals (e.g., zinc (Zn), indium (In), gallium (Ga), tin (Sn), titanium (Ti), and the like) or a mixture of the metals (e.g., zinc (Zn), indium (In), gallium (Ga), tin (Sn), titanium (Ti), and the like) and oxides of the metals. The oxide semiconductors may include indium-tin oxide (ITO), indium-gallium-zinc oxide (IGZO), zinc oxide (ZnO), indium-zinc oxide (IZO), zinc-indium oxide (ZIO), indium oxide (InO), titanium oxide (TiO), indium-zinc-tin oxide (IZTO), zinc-tin oxide (ZTO), and the like.

The second semiconductor pattern layer may include a plurality of areas having different electrical properties depending on whether the metal oxide is reduced. An area (hereinafter referred to as a "reduction area") in which the metal oxide is reduced may have higher conductivity than an area (hereinafter referred to as a "non-reduction area") in which the metal oxide is not reduced. The reduction area may substantially serve as a source electrode or drain electrode of a transistor. The non-reduction area may substantially correspond to an active (or a channel) of a transistor.

A third source electrode S3, a third active A3, and a third drain electrode D3 of the third transistor T3 may be formed from the second semiconductor pattern layer. The third source electrode S3 and the third drain electrode D3 may extend in opposite directions to each other from the third active A3. The third source electrode S3, the third active A3, and the third drain electrode D3 of the third transistor T3 may be defined as a third semiconductor pattern.

The circuit layer DP_CL may include a semiconductor pattern of the sensor driving circuit O_SD (see FIG. 6). FIG. 7 shows a cross section corresponding to the reset transistor ST1 of the semiconductor pattern of the sensor driving circuit O_SD (see FIG. 6). A source electrode SS1, an active SA1, and a drain electrode SD1 of the reset transistor ST1 may be formed from the second semiconductor pattern layer. The source electrode SS1, the active SA1, and the drain electrode SD1 of the reset transistor ST1 may be defined as a semiconductor pattern of the reset transistor ST1. Accordingly, the second semiconductor pattern layer may include a third semiconductor pattern and a semiconductor pattern of the reset transistor ST1.

The fourth insulating layer 40 may be located on the third insulating layer 30. The fourth insulating layer 40 may cover the second semiconductor pattern layer. That is, the fourth insulating layer 40 may cover the third semiconductor pattern of the third transistor T3 and the semiconductor pattern of the reset transistor ST1.

A third gate electrode G3 of the third transistor T3 and a gate electrode SG1 of the reset transistor ST1 may be located on the fourth insulating layer 40. The third gate electrode G3 may overlap the third active A3 on the plane (e.g., in a plan view), and the gate electrode SG1 of the reset transistor ST1 may overlap the active SA1 of the reset transistor ST1 on a plane (e.g., in a plan view). According to some embodiments, the third gate electrode G3 or the gate electrode SG1 of the reset transistor ST1 may be provided as a single electrode or may be provided as two electrodes.

The fifth insulating layer 50 may be located on the fourth insulating layer 40 to cover the third gate electrode G3 and the gate electrode SG1 of the reset transistor ST1. The sixth insulating layer 60, the seventh insulating layer 70, and the eighth insulating layer 80 may be sequentially located on the fifth insulating layer 50. At least one of the sixth insulating layer 60, the seventh insulating layer 70, or the eighth insulating layer 80 may be provided as an organic layer, and may provide a flat surface to a component located thereon.

A first connection electrode CNE1 may be located on the fifth insulating layer 50. The first connection electrode CNE1 may be connected to the connection signal line CSL through a contact hole CH1 penetrating the first to fifth insulating layers 10 to 50. A second connection electrode CNE2 may be located on the sixth insulating layer 60. The second connection electrode CNE2 may be connected to the first connection electrode CNE1 through a contact hole CH2 penetrating the sixth insulating layer 60. A third connection electrode CNE3 may be located on the seventh insulating layer 70. The third connection electrode CNE3 may be connected to the second connection electrode CNE2 through a contact hole CH5 penetrating the seventh insulating layer 70.

A fourth connection electrode CNE1-1 may be located on the fifth insulating layer 50. The fourth connection electrode CNE1-1 may be connected to the drain electrode SD1 of the reset transistor ST1 through a contact hole CH3 penetrating the fourth and fifth insulating layers 40 and 50. A fifth connection electrode CNE2-1 may be located on the sixth insulating layer 60. The fifth connection electrode CNE2-1 may be connected to the fourth connection electrode CNE1-1 through a contact hole CH4 penetrating the sixth insulating layer 60. A sixth connection electrode CNE3-1 may be located on the seventh insulating layer 70. The sixth connection electrode CNE3-1 may be connected to the fifth connection electrode CNE2-1 through a contact hole CH6 penetrating the seventh insulating layer 70.

According to some embodiments of the present disclosure, at least one of the fifth to seventh insulating layers 50 to 70 may be omitted, and thus at least one of the first to third connection electrodes CNE1 to CNE3 and the fourth to sixth connection electrodes CNE1-1 to CNE3-1 may be omitted.

The readout line RLd may be located on the sixth insulating layer 60. The readout line RLd may be located on the same layer as the second and fifth connection electrodes CNE2 and CNE2-1. The readout line RLd may be covered by the seventh insulating layer 70. According to some embodiments, the readout line RLd may be located on the same layer as the data line DLi (see FIG. 5). However, a layer on which the readout line RLd is located is not limited thereto.

The eighth insulating layer 80 may be located on the seventh insulating layer 70 to cover the third and sixth connection electrodes CNE3 and CNE3-1. The eighth insulating layer 80 may provide a base surface on which the element layer DP_ED is located.

The element layer DP_ED may be located on the circuit layer DP_CL. The element layer DP_ED may include a light emitting element ED_R, the sensing element OPD, and a pixel defining layer PDL. FIG. 7 shows the first light emitting element ED_R located in the first pixel area PXR and the sensing element OPD located adjacent to the first light emitting element ED_R. The description thereof may be identically applied to other light emitting elements and other sensing elements included in a display panel DP.

The first light emitting element ED_R may include a first electrode R_AE, a light emitting layer R_EL, and a second electrode R_CE. FIG. 7 shows the first light emitting element ED_R among the light emitting elements OLED (see FIG. 6). For example, the first light emitting element ED_R may include an organic light emitting element, a quantum dot light emitting element, a micro LED light emitting element, or a nano LED light emitting element. However, embodiments according to the present disclosure are not limited thereto. For example, the first light emitting element ED_R may include various embodiments as long as light is capable of being generated depending on an electrical signal or the amount of light is capable of being controlled depending on an electrical signal.

The sensing element OPD may include a sensing anode electrode O_AE, a photoelectric conversion layer O_RL, and a sensing cathode electrode O_CE. The sensing element OPD may be located adjacent to the first light emitting element ED_R within the display area DA (see FIG. 4). The sensing element OPD may be an optical sensor, which converts an optical signal into an electrical signal by sensing light incident toward the sensing element OPD. For example, the sensing element OPD may be a photodiode. The sensing element OPD may be located on the same layer as the first light emitting element ED_R.

The first electrode R_AE and the sensing anode electrode O_AE may be located on the eighth insulating layer 80 on which the first electrode R_AE and the sensing anode electrode O_AE are located on the same layer. The first electrode R_AE and the sensing anode electrode O_AE may be spaced from each other on a plane (e.g., in a plan view).

The first electrode R_AE may be connected to the third connection electrode CNE3 through a contact hole CH7 penetrating the eighth insulating layer 80. The first electrode R_AE may be electrically connected to the connection signal line CSL through the first to third connection electrodes CNE1 to CNE3.

The sensing anode electrode O_AE may be connected to the sixth connection electrode CNE3-1 through a contact hole CH8 penetrating the eighth insulating layer 80. The sensing anode electrode O_AE may be electrically connected to the drain electrode SD1 of the reset transistor ST1 through the fourth to sixth connection electrodes CNE1-1 to CNE3-1.

The pixel defining layer PDL may be located on the eighth insulating layer 80. A light emitting opening OP1 exposing at least part of the first electrode R_AE of the first light emitting element ED_R may be defined in the pixel defining layer PDL. The part of the first electrode R_AE exposed by the light emitting opening OP1 may correspond to the first pixel area PXR. A light receiving opening OP2 exposing at least part of the sensing anode electrode O_AE may be defined in the pixel defining layer PDL. The part of the sensing anode electrode O_AE exposed by the light receiving opening OP2 may correspond to the light receiving area FXA. The peripheral area NPXA may surround the first pixel area PXR and the light receiving area FXA.

The pixel defining layer PDL may be formed of polymer resin. For example, the pixel defining layer PDL may include polyacrylate-based resin or polyimide-based resin. The pixel defining layer PDL may be formed to further include an inorganic material in addition to the polymer resin. Moreover, the pixel defining layer PDL may be formed of an inorganic material. For example, the pixel defining layer PDL may be formed to include silicon nitride ($SiN_x$), silicon oxide ($SiO_x$), silicon oxynitride ($SiO_xN_y$), or the like.

The pixel defining layer PDL may include a light absorbing material. The pixel defining layer PDL may include a black coloring agent. The black coloring agent may include a black dye and a black pigment. The black coloring agent may include carbon black, a metal such as chromium, or an oxide thereof. However, embodiments according to the present disclosure are not necessarily limited thereto.

The light emitting layer R_EL may be interposed between the first electrode R_AE and the second electrode R_CE. The light emitting layer R_EL may be located in an area corresponding to the light emitting opening OP1. The light emitting layer R_EL may include an organic light emitting material and/or an inorganic light emitting material. For example, the light emitting layer R_EL may include a fluorescent or phosphorescent material, a metal organic complex light emitting material, or a quantum dot. The light emitting layer R_EL may emit light of one of red, green, and blue colors. FIG. 7 illustrates the light emitting layer R_EL emitting red color light.

Excitons may be formed by respectively applying the first driving voltage ELVDD (see FIG. 6) and the second driving voltage ELVSS (see FIG. 6) to the first electrode R_AE and the second electrode R_CE and then coupling holes and electrons injected into the light emitting layer R_EL. As the excitons transition to a ground state, the light emitting element OLED may emit light, and images may be displayed through the display area DA (see FIG. 4).

The photoelectric conversion layer O_RL may be interposed between the sensing anode electrode O_AE and the sensing cathode electrode O_CE. The photoelectric conversion layer O_RL may be located in an area corresponding to the light receiving opening OP2. The photoelectric conversion layer O_RL may include a light receiving material that receives light and converts the light into an electrical signal. The photoelectric conversion layer O_RL may include an organic light receiving material. For example, the photoelectric conversion layer O_RL may include a conjugated polymer. The photoelectric conversion layer O_RL may include thiophene-based conjugated polymer, benzodithiophene-based conjugated polymer, thieno [3,4-c] pyrrole-4, 6-dione (TPD)-based conjugated polymer, diketo-pyrrole-pyrrole (DPP)-based conjugated polymer, benzothiadiazole (BT)-based conjugated polymer, or the like. However, a material of the photoelectric conversion layer O_RL is not limited to the example.

The second electrode R_CE of the first light emitting element ED_R and the sensing cathode electrode O_CE of the sensing element OPD may be provided as the common electrode C_CE thus integrally connected. In other words, the second electrode R_CE may correspond to a part of the common electrode C_CE overlapping the first electrode R_AE, and the sensing cathode electrode O_CE may correspond to a part of the common electrode C_CE overlapping the sensing anode electrode O_AE. The common electrode C_CE may be provided to a common layer and may overlap the first pixel area PXR, the light receiving area FXA, and the peripheral area NPXA.

Each of the first electrode R_AE, the sensing anode electrode O_AE, and the common electrode C_CE may include at least one selected from Ag, Mg, Cu, Al, Pt, Pd, Au, Ni, Nd, Ir, Cr, Li, Ca, LiF, Mo, Ti, W, In, Sn, and Zn, two or more compounds selected from the above-described element, a mixture of two or more types selected from the above-described element, or oxide thereof.

Each of the first electrode R_AE, the sensing anode electrode O_AE, and the common electrode C_CE may be a transmissive electrode, a transflective electrode, or a reflective electrode. The transmissive electrode may include a transparent metal oxide, for example, indium tin oxide (ITO), indium zinc oxide (IZO), zinc oxide (ZnO), indium tin zinc oxide (ITZO), or the like. The transflective electrode or the reflective electrode may include Ag, Mg, Cu, Al, Pt, Pd, Au, Ni, Nd, Ir, Cr, Li, Ca, LiF/Ca (the stacked structure of LiF and Ca), LiF/Al (the stacked structure of LiF and Al), Mo, Ti, Yb, W, a compound including the above-described element, or a mixture (e.g., AgMg, AgYb, or MgYb) including the above-described element.

The first electrode R_AE, the sensing anode electrode O_AE, and the common electrode C_CE may have a multi-layer structure including a reflective film or a transflective film, which is formed of the above-described materials, a transparent conductive film formed of indium tin oxide (ITO), indium zinc oxide (IZO), zinc oxide (ZnO), indium tin zinc oxide (ITZO), and the like. For example, an electrode having the multi-layer structure may have a three-layer structure of ITO/Ag/ITO, but is not limited thereto.

The encapsulation layer TFE may be located on the element layer DP_ED to seal the first light emitting element ED_R and the sensing element OPD. To improve the optical efficiency of elements of the element layer DP_ED or to protect the elements, thin films of the encapsulation layer TFE may include at least one thin film.

According to some embodiments, the encapsulation layer TFE may include a plurality of inorganic layers and at least one organic layer located between the inorganic layers. The plurality of inorganic layers may protect elements from moisture and/or oxygen. For example, the plurality of inorganic layers may include at least one of aluminum oxide, titanium oxide, silicon oxide, silicon nitride, silicon oxynitride, zirconium oxide, or hafnium oxide. The organic layer may protect elements from foreign substances such as dust particles. For example, the organic film may include acryl-based resin.

Figure 8A:
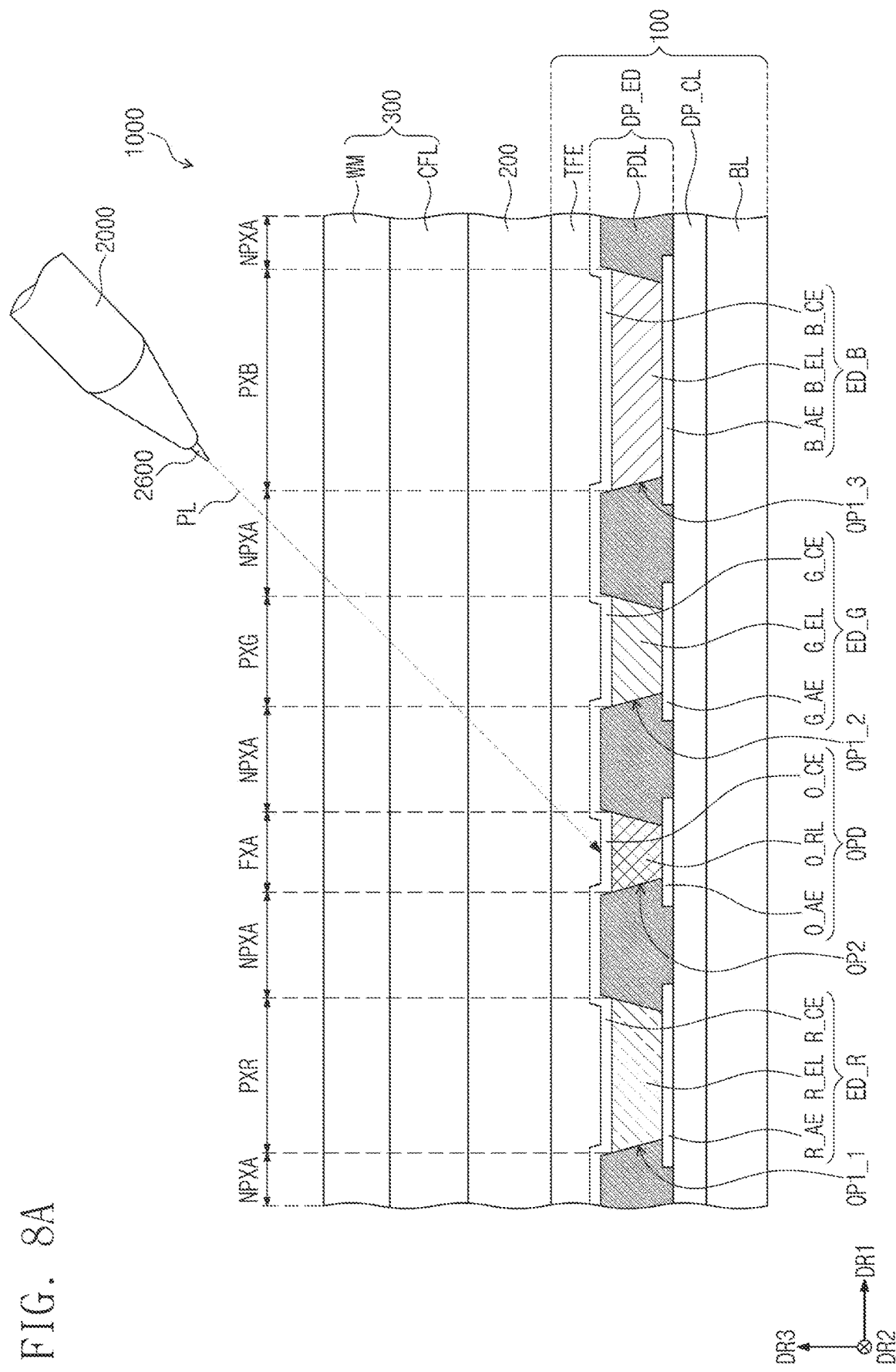
FIG. 8A illustrates an electronic device and an input device, according to some embodiments of the present disclosure.

FIG. 8A illustrates an electronic device and an input device, according to some embodiments of the present disclosure.

Referring to FIG. 8A, the light emitting element OLED (see FIG. 6) may include first to third light emitting elements ED_R, ED_G, and ED_B. The element layer DP_ED may include the first to third light emitting elements ED_R, ED_G, and ED_B and the sensing element OPD, which are located on the circuit layer DP_CL. The first light emitting element ED_R may include the first electrode R_AE, the light emitting layer R_EL, and the second electrode R_CE; the second light emitting element ED_G may include the first electrode G_AE, the light emitting layer G_EL, and the second electrode G_CE; and, the third light emitting element ED_B may include the first electrode B_AE, the light emitting layer B_EL, and the second electrode B_CE. The sensing element OPD may include the sensing anode electrode O_AE, the photoelectric conversion layer O_RL, and the sensing cathode electrode O_CE.

The first to third light emitting openings OP1_1, OP1_2, and OP1_3 and the light receiving opening OP2 may be defined in the pixel defining layer PDL. The first to third light emitting elements ED_R, ED_G, and ED_B may be arranged to correspond to the first to third light emitting openings OP1_1, OP1_2, and OP1_3, respectively. The sensing element OPD may be arranged to correspond to the light receiving opening OP2.

The first electrodes R_AE, G_AE, and B_AE and the sensing anode electrode O_AE may be spaced from each other on the same layer. The first electrodes R_AE, G_AE, and B_AE and the sensing anode electrode O_AE may be simultaneously formed through the same process as one another. At least part of the first electrode R_AE may be exposed by the first light emitting openings OP1_1; at least part of the first electrode G_AE may be exposed by the first light emitting openings OP1_2; and, at least part of the first electrode B_AE may be exposed by the first light emitting openings OP1_3. At least part of the sensing anode electrode O_AE may be exposed by the light receiving opening OP2.

Areas where the first to third light emitting elements ED_R, ED_G, and ED_B are located may correspond to the first to third pixel areas PXR, PXG, and PXB, respectively. Colors of light emitted through the first to third pixel areas PXR, PXG, and PXB may be different from one another. The peripheral area NPXA may surround the first to third pixel areas PXR, PXG, and PXB, may set the boundaries of the first to third pixel areas PXR, PXG, and PXB, and may prevent or reduce color mixing between the first to third pixel areas PXR, PXG, and PXB.

An area where the sensing element OPD is located may correspond to the light receiving area FXA. The peripheral area NPXA may surround the light receiving area FXA. The light receiving area FXA surrounded by the peripheral area NPXA may be distinguished from the first to third pixel areas PXR, PXG, and PXB.

The light emitting layers R_EL, G_EL, and B_EL of the first to third light emitting elements ED_R, ED_G, and ED_B may be located in the first to third light emitting openings OP1_1, OP1_2, and OP1_3, respectively. That is, the light emitting layers R_EL, G_EL, and B_EL of the first to third light emitting elements ED_R, ED_G, and ED_B may be formed in a pattern form separated from each other. Each of the light emitting layers R_EL, G_EL, and B_EL includes an organic material and/or an inorganic material, and may generate light of a color (e.g., a set or predetermined color). Also, the light emitting layers R_EL, G_EL, and B_EL may have a multi-layer structure that is referred to as "tandem".

The light emitting layers R_EL, G_EL, and B_EL of the first to third light emitting elements ED_R, ED_G, and ED_B may generate light of different colors. However, embodiments according to the present disclosure are not limited thereto. For example, the light emitting layers R_EL, G_EL, and B_EL of the first to third light emitting elements ED_R, ED_G, and ED_B may be respectively arranged commonly in the first to third pixel areas PXR, PXG, and PXB to generate blue light or white light, which is source light having the same color as each other.

The photoelectric conversion layer O_RL may be located in the light receiving opening OP2. The above-mentioned description may be identically applied to the photoelectric conversion layer O_RL.

The second electrodes R_CE, G_CE, and B_CE of the first to third light emitting elements ED_R, ED_G, and ED_B may be electrically connected to each other. For example, the second electrodes R_CE, G_CE, and B_CE of the first to third light emitting elements ED_R, ED_G, and ED_B may have an integral shape. The second electrodes R_CE, G_CE, and B_CE may have an integral shape with the sensing cathode electrode O_CE of the sensing element OPD. Accordingly, the second electrodes R_CE, G_CE, and B_CE and the sensing cathode electrode O_CE are integrally connected to be provided as the common electrode C_CE (see FIG. 6) that overlaps the first to third pixel areas PXR, PXG, and PXB, the peripheral area NPXA, and the light receiving area FXA.

The electronic device 1000 may further include the sensor layer 200 located on the display layer 100, and an upper member layer 300 located on the sensor layer 200.

The sensor layer 200 may be directly located on the encapsulation layer TFE. However, embodiments according to the present disclosure are not limited thereto. For example, the sensor layer 200 may be coupled to the encapsulation layer TFE through a separate adhesive layer.

The upper member layer 300 may include an anti-reflection layer CFL and a window WM. The anti-reflection layer CFL may be located on the sensor layer 200. The anti-reflection layer CFL may reduce the reflectance of external light incident from the upper side of the window WM. According to some embodiments of the present disclosure, the anti-reflection layer CFL may be omitted.

The window WM may be located on the anti-reflection layer CFL. The window WM may include an optically transparent insulating material. For example, the window WM may include glass or plastic. The window WM may have a single layer structure or a multi-layer structure. For example, the window WM may include a plurality of plastic films bonded to each other by an adhesive or may include a glass substrate and a plastic film bonded to each other by an adhesive.

The light output unit 2600 of the input device 2000 may provide a first input PL to the electronic device 1000. The first input PL may include infrared light. The first input PL may be provided to the sensing element OPD. The sensing element OPD may generate photocharges corresponding to the infrared light.

The fingerprint controller RC (see FIG. 2) may provide the sensor controller 200C (see FIG. 2) with information about a location where the first input PL is sensed from the sensing element OPD sensing the first input PL. The sensor controller 200C (see FIG. 2) may calculate coordinate information of the first input PL based on the information received from the fingerprint controller RC (see FIG. 2).

According to some embodiments of the present disclosure, the fingerprint controller RC (see FIG. 2) may easily detect the first input PL through the plurality of sensing elements OPD located on the whole surface of the display area DA (see FIG. 4). The sensor controller 200C (see FIG. 2) may easily calculate the coordinate information of the input device 2000. Accordingly, the interface device 10000 (see FIG. 1A) having improved sensing reliability may be provided.

Figure 8B:
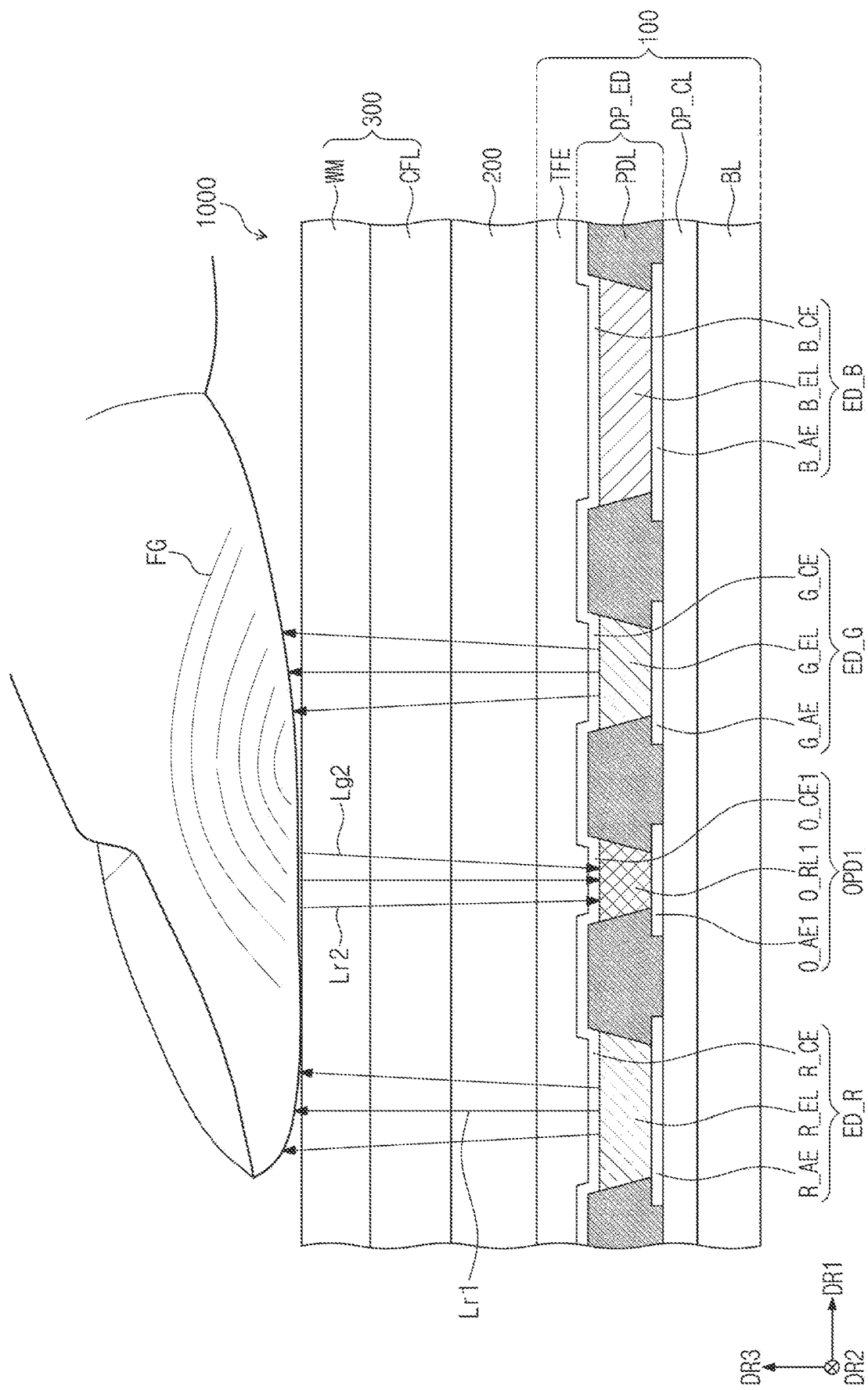
FIG. 8B is a cross-sectional view of an electronic device, according to some embodiments of the present disclosure.

FIG. 8B is a cross-sectional view of an electronic device, according to some embodiments of the present disclosure. In the description of FIG. 8B, the same reference numerals are assigned to the same components described with reference to FIG. 8A, and thus the descriptions thereof are omitted to avoid redundancy.

Referring to FIG. 8B, each of the first to third light emitting elements ED_R, ED_G, and ED_B may emit light. For example, the first light emitting element ED_R may output red light in a red wavelength band; the second light emitting element ED_G may output green light in a green wavelength band; and, the third light emitting element ED_B may output blue light in a blue wavelength band.

The sensing element OPD may receive light from the first to third light emitting elements ED_R, ED_G, and ED_B. In other words, the sensing element OPD may receive reflected light L2, which is obtained as light L1 output from each of the first to third light emitting elements ED_R, ED_G, and ED_B is reflected by a user's biometric information FG. The biometric information FG may be a fingerprint. The sensing element OPD may generate photocharges corresponding to the reflected light L2 that is reflected by a ridge of the biometric information FG or a valley between ridges of the biometric information FG.

Figure 9:
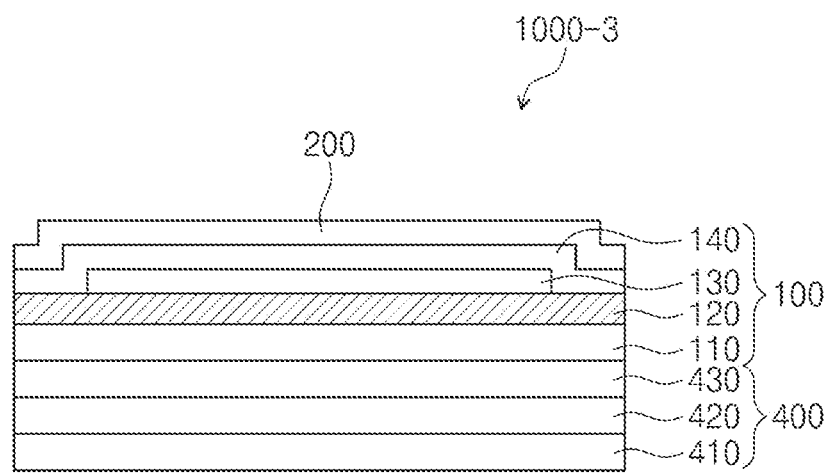
FIG. 9 is a cross-sectional view of an electronic device, according to some embodiments of the present disclosure.

FIG. 9 is a cross-sectional view of an electronic device, according to some embodiments of the present disclosure. In the description of FIG. 9, the same reference numerals are assigned to the same components described with reference to FIG. 3A, and thus the descriptions thereof are omitted to avoid redundancy.

Referring to FIG. 9, an electronic device 1000-3 may include the display layer 100, the sensor layer 200, and a sensing unit 400.

The sensing unit 400 may be located under the display layer 100. The sensing unit 400 may include a base layer 410, a biometric information sensing layer 420, and an optical pattern layer 430.

The base layer 410 may include a synthetic resin layer. The synthetic resin layer may include a thermosetting resin. In detail, the synthetic resin layer may be a polyimide-based resin layer, and the material thereof is not particularly limited thereto. For example, the base layer 410 may include two polyimide-based resin layers and a barrier layer interposed between the polyimide-based resin layers. The barrier layer may include amorphous silicon and silicon oxide.

The biometric information sensing layer 420 may be located on the base layer 410. The biometric information sensing layer 420 may include a sensor and insulating layers. The sensor may include at least one transistor and at least one photodiode. When viewed from above a plane (e.g., in a plan view), the biometric information sensing layer 420 may overlap the entire display area of the display layer 100.

The optical pattern layer 430 may be directly located on the biometric information sensing layer 420. For example, the optical pattern layer 430 and the biometric information sensing layer 420 may be formed through sequential processes. The optical pattern layer 430 may protect the biometric information sensing layer 420 from foreign objects.

The optical pattern layer 430 may filter light incident to the biometric information sensing layer 420. For example, an incident angle of light capable of passing through the optical pattern layer 430 may be controlled by the optical pattern layer 430. The incident angle may be limited to an angle (e.g., a set or predetermined angle or less). As the incident angle is limited, the accuracy of fingerprint recognition may be improved.

When the electronic device 1000-3 includes the sensing unit 400, the plurality of sensors FX (see FIG. 4) of the display layer 100 may be omitted. That is, in the electronic device 1000-3 according to some embodiments of the present disclosure, the function of the plurality of sensors FX (see FIG. 4) may be replaced with the biometric information sensing layer 420.

Figure 10:
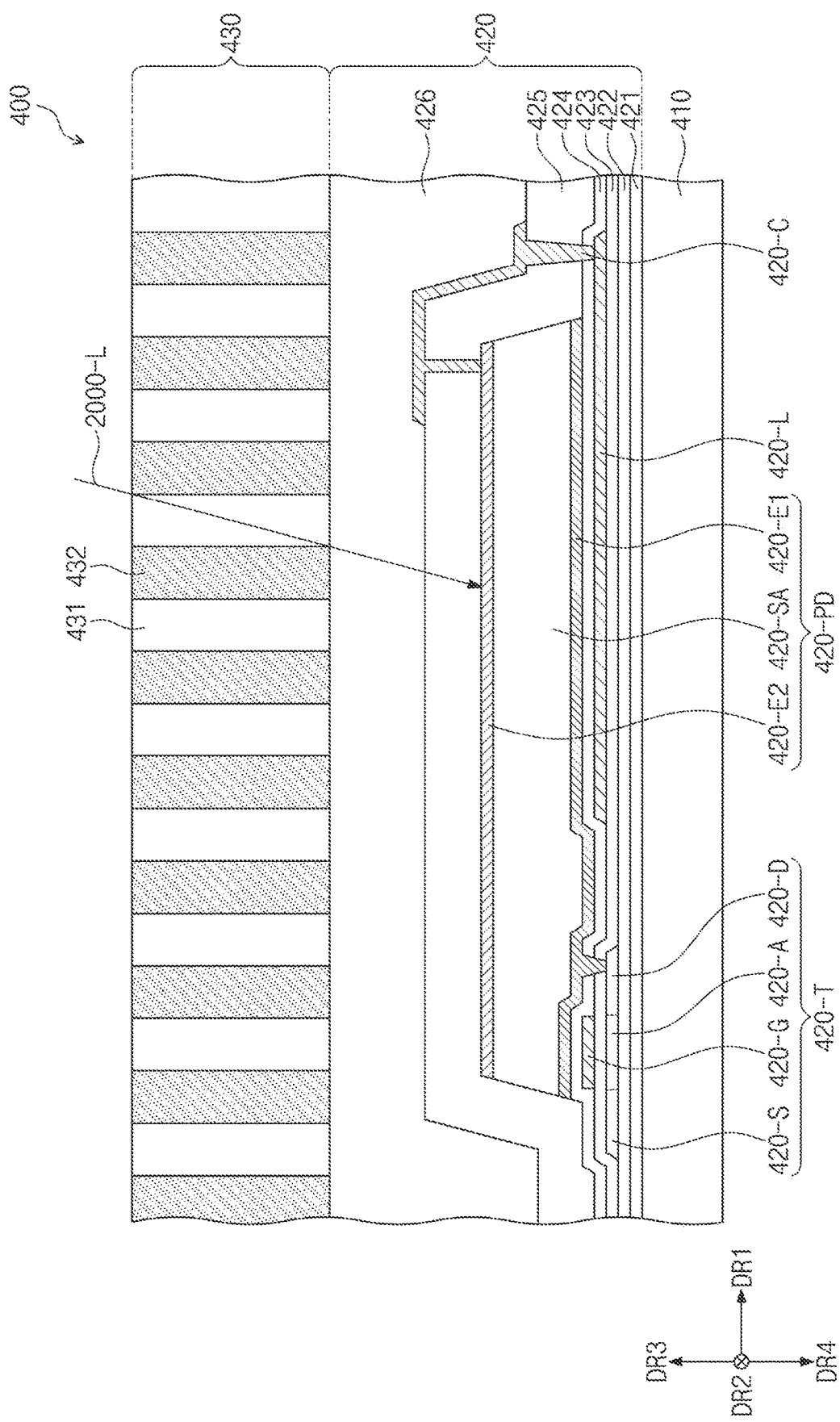
FIG. 10 is a cross-sectional view of a sensing unit, according to some embodiments of the present disclosure.

FIG. 10 is a cross-sectional view of a sensing unit, according to some embodiments of the present disclosure. In the description of FIG. 10, the same reference numerals are assigned to the same components described with reference to FIG. 9, and thus the descriptions thereof are omitted to avoid redundancy.

Referring to FIGS. 9 and 10, the sensing unit 400 may include the base layer 410, the biometric information sensing layer 420, and the optical pattern layer 430.

The biometric information sensing layer 420 may include a barrier layer 421, a buffer layer 422, sensors 420-T and 420-PD, and insulating layers 423, 424, 425, and 426.

The barrier layer 421 may be located on the base layer 410. The buffer layer 422 may be located on the barrier layer 421.

The sensors 420-T and 420-PD may include the transistor 420-T and the sensing element 420-PD. The transistor 420-T may be located on the buffer layer 422. The transistor 420-T may include an active 420-A, a source 420-S, a drain 420-D, and a gate 420-G. The active 420-A, the source 420-S, and the drain 420-D may be located on the buffer layer 422.

The first insulating layer 423 is located on the buffer layer 422 to cover the active 420-A, the source 420-S, and the drain 420-D. The first insulating layer 423 may be an inorganic layer and/or an organic layer, and may have a single layer structure or a multi-layer structure. According to some embodiments, the first insulating layer 423 may be a single silicon oxide layer.

The gate 420-G and a wiring layer 420-L may be located on the first insulating layer 423. A voltage (e.g., a set or predetermined voltage), for example, a bias voltage may be provided to the wiring layer 420-L. The wiring layer 420-L may be electrically connected to the sensing element 420-PD to be described later.

The second insulating layer 424 may be located on the first insulating layer 423 to cover the gate 420-G and the wiring layer 420-L. The second insulating layer 424 may be an inorganic layer, and may have a single layer structure or a multi-layer structure. According to some embodiments, the second insulating layer 424 may be a silicon oxide layer having a single layer structure.

The sensing element 420-PD may be located on the second insulating layer 424. The sensing element 420-PD may be electrically connected to the transistor 420-T and the wiring layer 420-L. For example, an operation of the sensing element 420-PD may be controlled by a signal provided from the transistor 420-T and may receive a voltage (e.g., a set or predetermined voltage) from the wiring layer 420-L.

The sensing element 420-PD may include a first sensing electrode 420-E1, a sensing layer 420-SA, and a second sensing electrode 420-E2.

The first sensing electrode 420-E1 may be electrically connected to the transistor 420-T by passing through the first and second insulating layers 423 and 424. The first sensing electrode 420-E1 may include an opaque conductive material. For example, the first sensing electrode 420-E1 may include molybdenum (Mo).

The sensing layer 420-SA may be located on the first sensing electrode 420-E1. The sensing layer 420-SA may include amorphous silicon.

The second sensing electrode 420-E2 may be located on the sensing layer 420-SA. The second sensing electrode 420-E2 may include a transparent conductive material. For example, the second sensing electrode 420-E2 may include indium-tin oxide (ITO).

The third insulating layer 425 may be located on the second sensing electrode 420-E2. The third insulating layer 425 may be an inorganic layer, and may have a single layer structure or a multi-layer structure. For example, the third insulating layer 425 may include a silicon oxide layer and a silicon nitride layer.

A connection electrode 420-C may be located on the third insulating layer 425. The connection electrode 420-C may be electrically connected to the second sensing electrode 420-E2 by passing through the third insulating layer 425. In addition, the connection electrode 420-C may be electrically connected to the wiring layer 420-L by passing through the second and third insulating layers 424 and 425.

The fourth insulating layer 426 may be located on the third insulating layer 425 to cover the connection electrode 420-C. The fourth insulating layer 426 may be an organic layer, and may have a single layer structure or a multi-layer structure. For example, the fourth insulating layer 426 may be a polyimide-based resin layer having a single layer structure.

The optical pattern layer 430 may be interposed between the biometric information sensing layer 420 and the display layer 100 (see FIG. 9). For example, the optical pattern layer 430 may be directly located on the fourth insulating layer 426. That is, the optical pattern layer 430 and the biometric information sensing layer 420 may be formed through sequential processes.

According to some embodiments of the present disclosure, because the optical pattern layer 430 is directly located on the biometric information sensing layer 420, a distance between the optical pattern layer 430 and the second sensing electrode 420-E2 may be reduced. As a result, a phenomenon that interference occurs between pieces of light passing through the optical pattern layer 430 is prevented or reduced, thereby improving the recognition accuracy of biometric information.

The optical pattern layer 430 may include a plurality of transmissive parts 431 and a light blocking part 432. Each of the plurality of transmissive parts 431 may have optical transparency. Each of the plurality of transmissive parts 431 may have higher light transmittance than the light blocking part 432. Each of the plurality of transmissive parts 431 may include a transparent organic material. The light blocking part 432 may have a property of absorbing light. The light blocking part 432 may include an organic material.

When viewed from above a plane (e.g., in a plan view), the plurality of transmissive parts 431 and the light blocking part 432 may overlap the sensing element 420-PD. Light 2000-L reflected from the biometric information FG (see FIG. 8B) may be incident to the sensing element 420-PD by passing through the plurality of transmissive parts 431.

Alternatively, the first input PL (see FIG. 8A) provided from the input device 2000 (see FIG. 8A) to the electronic device 1000-3 may be provided to the sensing element 420-PD by passing through the plurality of transmissive parts 431. The sensing element 420-PD may generate photocharges corresponding to the infrared light.

At this time, the fingerprint controller RC (see FIG. 2) may control a plurality of sensors of the sensing unit 400. The fingerprint controller RC (see FIG. 2) may provide the sensor controller 200C (see FIG. 2) with information about a location where the first input PL is sensed from the sensing element 420-PD sensing the first input PL. The sensor controller 200C (see FIG. 2) may calculate coordinate information of the first input PL based on the information received from the fingerprint controller RC (see FIG. 2).

According to some embodiments of the present disclosure, the fingerprint controller RC (see FIG. 2) may easily detect the first input PL through the plurality of sensing elements 420-PD located on the whole surface of the display area. The sensor controller 200C (see FIG. 2) may easily calculate the coordinate information of the input device 2000. Accordingly, the interface device 10000 (see FIG. 1A) having improved sensing reliability may be provided.

Figure 11:
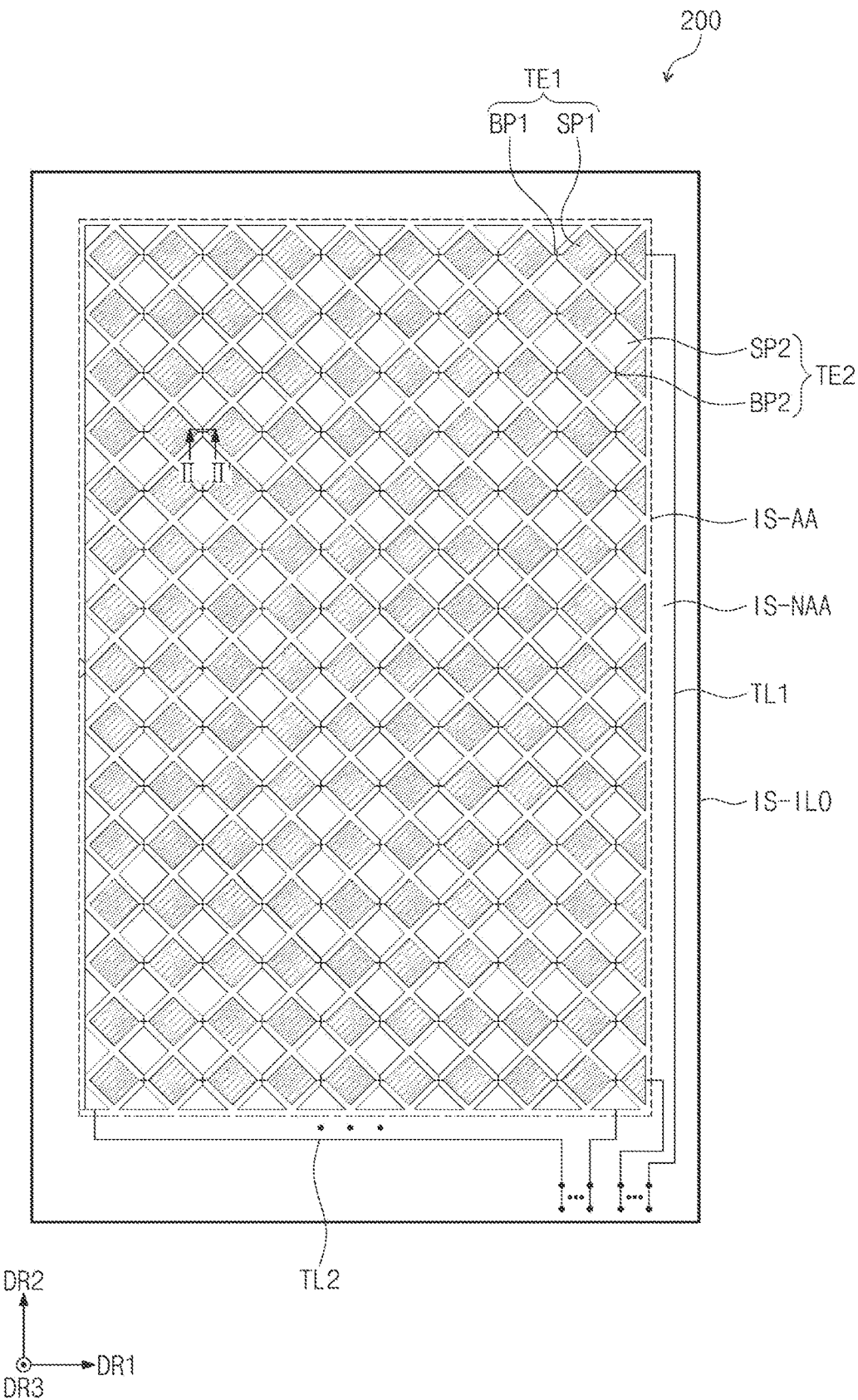
FIG. 11 is a plan view of a sensor layer, according to some embodiments of the present disclosure.
Figure 12:
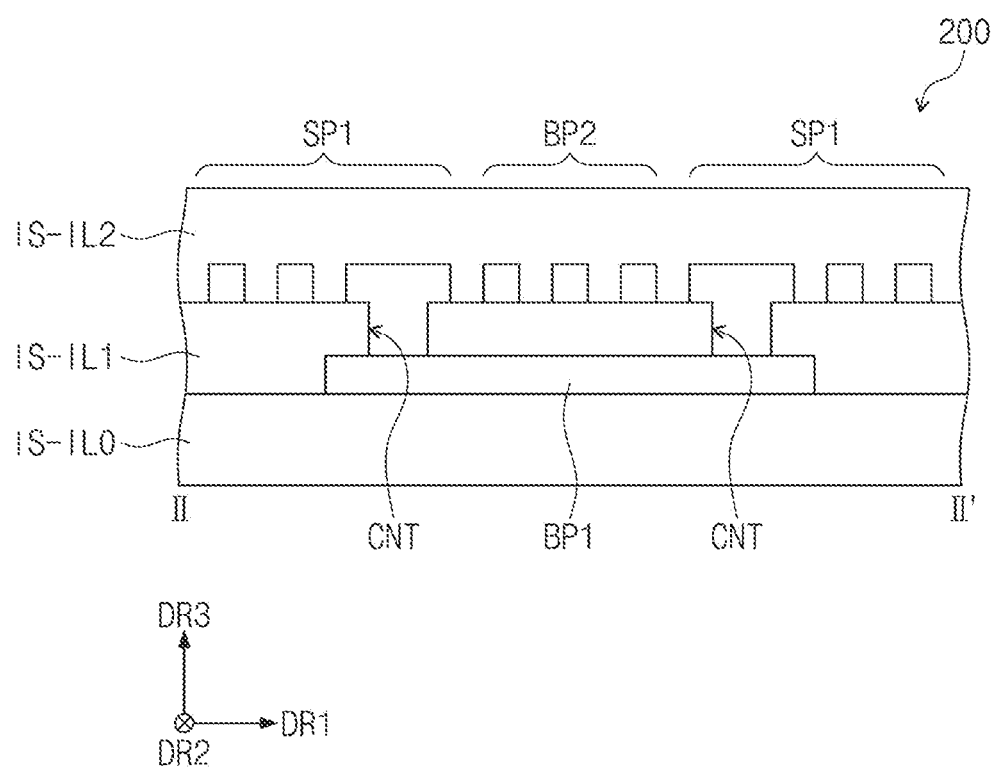
FIG. 12 is a cross-sectional view of a sensor layer taken along the line II-II' of FIG. 11, according to some embodiments of the present disclosure.

FIG. 11 is a plan view of a sensor layer, according to some embodiments of the present disclosure. FIG. 12 is a cross-sectional view of a sensor layer taken along the line II-II' of FIG. 11, according to some embodiments of the present disclosure.

Referring to FIGS. 11 and 12, the sensor layer 200 may define an active area IS-AA and a peripheral area IS-NAA surrounding the active area IS-AA. The active area IS-AA may be activated depending on an electrical signal. For example, the active area IS-AA may be an area for sensing an input. When viewed from above a plane (e.g., in a plan view), the active area IS-AA of the sensor layer 200 may overlap the active area 1000A (see FIG. 1A) of the electronic device 1000 (see FIG. 1A). The peripheral area IS-NAA of the sensor layer 200 may overlap the peripheral area 1000NA (see FIG. 1A) of the electronic device 1000 (see FIG. 1A).

The sensor layer 200 may include a base insulating layer IS-IL0, a plurality of sensing electrodes TE1 and TE2, and a plurality of sensing lines TL1 and TL2. The plurality of sensing electrodes TE1 and TE2 may be referred to as "input sensing sensors". The plurality of sensing electrodes TE1 and TE2 may include the plurality of first sensing electrodes TE1 and the plurality of second sensing electrodes TE2. The plurality of first sensing electrodes TE1 and the plurality of second sensing electrodes TE2 may be arranged in the active area IS-AA.

The plurality of sensing lines TL1 and TL2 may be arranged in the peripheral area IS-NAA.

The base insulating layer IS-IL0 may be an inorganic layer including one of silicon nitride, silicon oxynitride, and silicon oxide. Alternatively, the base insulating layer IS-IL0 may be an organic layer including epoxy resin, acrylate resin, or imide-based resin. The base insulating layer IS-IL0 may be formed directly on the display layer 100 (see FIG. 3A). Alternatively, the base insulating layer IS-IL0 may be coupled to the display layer 100 (see FIG. 3A) through an adhesive member.

The sensor layer 200 may obtain information about an external input through a change in capacitance between the plurality of first sensing electrodes TE1 and the plurality of second sensing electrodes TE2.

Each of the plurality of first sensing electrodes TE1 may extend in the first direction DR1, and the plurality of first sensing electrodes TE1 may be arranged in the second direction DR2. Each of the plurality of first sensing electrodes TE1 may include a plurality of sensing patterns SP1 and a plurality of bridge patterns BP1. Each of the plurality of bridge patterns BP1 may electrically connect the two sensing patterns SP1 adjacent to each other. The plurality of sensing patterns SP1 may have a mesh structure. Each of the plurality of second sensing electrodes TE2 may extend in the second direction DR2, and the plurality of second sensing electrodes TE2 may be arranged in the first direction DR1. Each of the plurality of second sensing electrodes TE2 may include a plurality of first portions SP2 and a plurality of second portions BP2. Each of the plurality of second portions BP2 may electrically connect the two first portions SP2 adjacent to each other. The plurality of first portions SP2 and the plurality of second portions BP2 may have a mesh structure.

FIG. 11 illustrates an example in which the one bridge pattern BP1 is connected to the two sensing patterns SP1 adjacent to each other. However, a connection relationship between the plurality of bridge patterns BP1 and the plurality of sensing patterns SP1 according to some embodiments of the present disclosure is not limited thereto. For example, the two adjacent sensing patterns SP1 may be connected by the two bridge patterns BP1.

The plurality of second portions BP2 may be located on a layer different from a layer on which the plurality of bridge patterns BP1 are located. The plurality of bridge patterns BP1 may be intersected with the plurality of second sensing electrodes TE2 so as to be insulated from each other. For example, the plurality of second portions BP2 may be intersected with the plurality of bridge patterns BP1 so as to be insulated from each other.

The plurality of sensing lines TL1 and TL2 may include the plurality of first sensing lines TL1 and the plurality of second sensing lines TL2. The plurality of first sensing lines TL1 may be electrically connected to the plurality of first sensing electrodes TE1, respectively. The plurality of second sensing lines TL2 may be electrically connected to the plurality of second sensing electrodes TE2, respectively.

The plurality of first sensing lines TL1 and the plurality of second sensing lines TL2 may be electrically connected to sensing pads through contact holes.

The plurality of bridge patterns BP1 may be located on the base insulating layer IS-IL0. The first insulating layer IS-IL1 may be located on the plurality of bridge patterns BP1. The first insulating layer IS-IL1 may have a single layer or multi-layer structure. The first insulating layer IS-IL1 may include an inorganic material, an organic material, or a composite material.

The plurality of sensing patterns SP1, the plurality of first portions SP2, and the plurality of second portions BP2 may be located on the first insulating layer IS-IL1. The plurality of sensing patterns SP1, the plurality of first portions SP2, and the plurality of second portions BP2 may have a mesh structure.

The plurality of contact holes CNT may be formed by penetrating the first insulating layer IS-IL1 in the third direction DR3. The two adjacent sensing patterns SP1 among the plurality of sensing patterns SP1 may be electrically connected to the bridge pattern BP1 through the plurality of contact holes CNT.

A second insulating layer IS-IL2 may be located on the plurality of sensing patterns SP1, the plurality of first portions SP2, and the plurality of second portions BP2. The second insulating layer IS-IL2 may have a single layer or multi-layer structure. The second insulating layer IS-IL2 may include an inorganic material, an organic material, or a composite material.

FIG. 12 illustrates a bottom bridge structure in which the plurality of bridge patterns BP1 is located under the plurality of sensing patterns SP1, the plurality of first portions SP2, and the plurality of second portions BP2, but is not limited thereto. For example, the sensor layer 200 may have a top bridge structure in which the plurality of bridge patterns BP1 is located on the plurality of sensing patterns SP1, the plurality of first portions SP2, and the plurality of second portions BP2.

Figure 13:
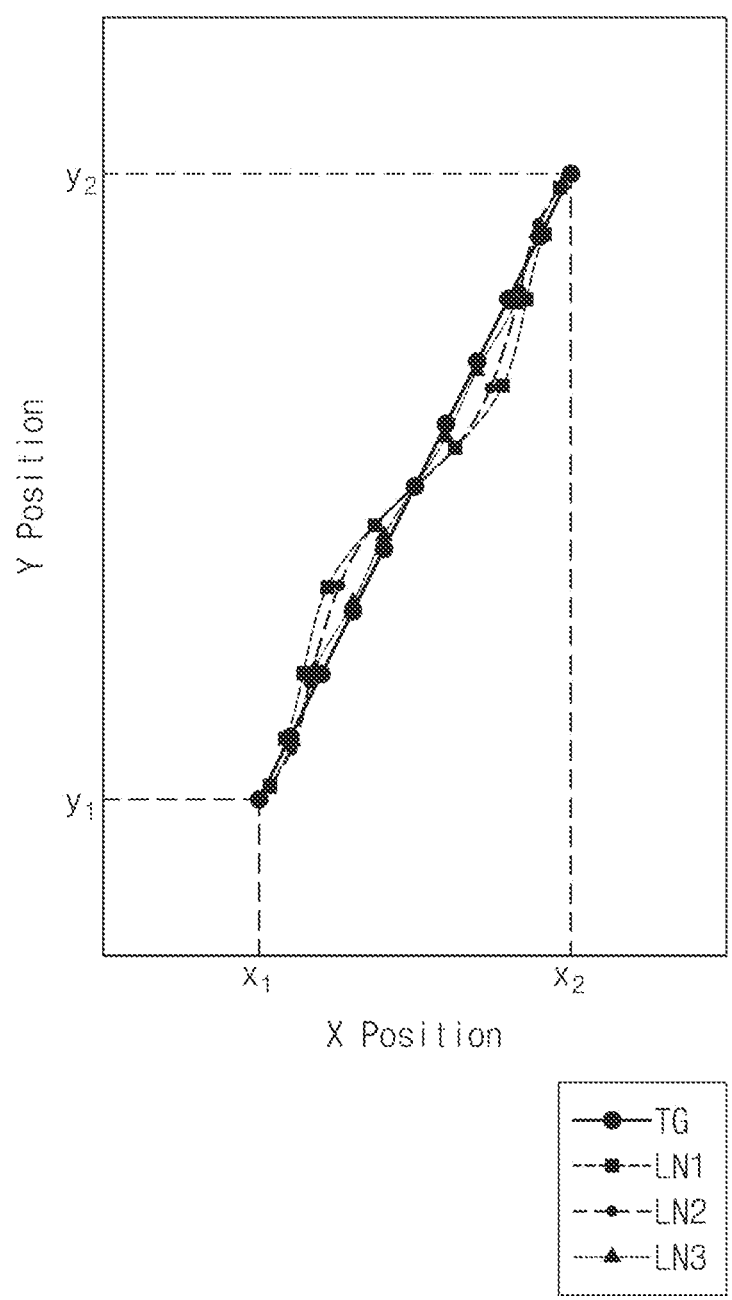
FIG. 13 is a graph illustrating the coordinate linearity of an input device according to the type of a sensing element, according to some embodiments of the present disclosure.

FIG. 13 is a graph illustrating the coordinate linearity of an input device according to the type of a sensing element, according to some embodiments of the present disclosure.

Referring to FIGS. 2 and 13, a path measured when the input device 2000 is moved from first coordinates $(x_1, y_1)$ to second coordinates $(x_2, y_2)$ is shown. A first path TG shows a path on which the input device 2000 is moved actually. A second path LN1 is a path obtained as coordinates are calculated by measuring a first input of the input device 2000 by using the sensor layer 200 including a plurality of sensing electrodes, each of which has a rhombus pattern or diamond-shaped pattern. A third path LN2 is a path obtained as coordinates are calculated by measuring the first input of the input device 2000 by using the sensor layer 200 including a plurality of sensing electrodes, each of which has a bar-shaped pattern. A fourth path LN3 is a path obtained as coordinates are calculated by measuring the first input of the input device 2000 by using the plurality of sensors FX (see FIG. 4) instead of measuring the first input of the input device 2000 by using the sensor layer 200. That is, the fourth path LN3 is obtained by measuring movement coordinates of the first input of the input device 2000 by using the electronic device 1000 according to some embodiments of the present disclosure.

An area size of each of the plurality of sensing electrodes TE1 and TE2 (see FIG. 11) may be greater than an area size of each of the plurality of sensing elements OPD (see FIG. 7). The number of sensing electrodes TE1 and TE2 (see FIG. 11) per unit area may be less than the number of sensing elements OPD (see FIG. 7) per unit area.

According to some embodiments of the present disclosure, when viewed from above a plane (e.g., in a plan view), a sensor resolution of the plurality of sensors FX (see FIG. 4) of the display layer 100 may be higher than that of the plurality of sensing electrodes TE1 and TE2 (see FIG. 11) of the sensor layer 200. The input device 2000 may include the second transmission circuit 2430 outputting an optical signal through the light output unit 2600. As compared to a case that the plurality of sensors FX (see FIG. 4) receive the optical signal and then measure movement coordinates of a first input of the input device 2000 by using the sensor layer 200, the plurality of sensors FX (see FIG. 4) may measure the movement coordinates of the first input of the input device 2000 with a high resolution. The linearity of coordinates for a movement path of the input device 2000 may be improved. Accordingly, the electronic device 1000 having improved sensing reliability and the interface device 10000 including the same may be provided.

Unlike embodiments of the present disclosure, movement path coordinates of the input device 2000 may be measured by using the plurality of sensing electrodes TE1 and TE2 (see FIG. 11) of the sensor layer 200. In this case, the second path LN1 or the third path LN2 may be calculated depending on the shape of a plurality of sensing electrodes TE1 and TE2 (see FIG. 11). The second path LN1 may be vertically spaced from the first path TG by a maximum first vertical distance. For example, the first vertical distance may be 0.415 millimeter (mm). The third path LN2 may be vertically spaced from the first path TG by a maximum second vertical distance. For example, the second vertical distance may be 0.291 mm. It may be interpreted that the linearity of coordinates for a movement path of the input device 2000 is low as the vertical distance is great. However, according to some embodiments of the present disclosure, the electronic device 1000 may measure the movement path coordinates of the input device 2000 by using the plurality of sensors FX (see FIG. 4) of the display layer 100. In this case, the fourth path LN3 may be calculated. The fourth path LN3 may be vertically spaced from the first path TG by a maximum third vertical distance. For example, the third vertical distance may be 0.108 mm. The third vertical distance may be smaller than the first vertical distance and the second vertical distance. That is, the linearity of coordinates for a movement path of the input device 2000 may be improved. Accordingly, the electronic device 1000 providing a better user experience and the interface device 10000 including the electronic device 1000 may be provided.

Figure 14:
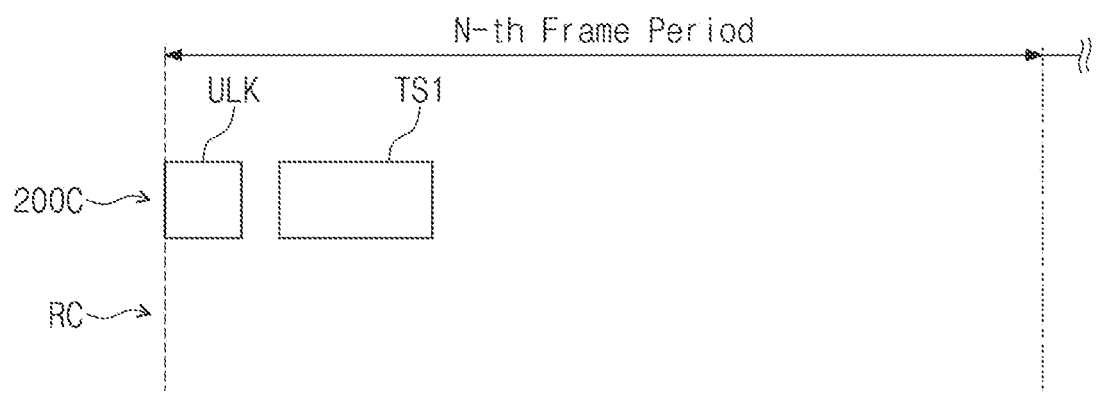
FIGS. 14 to 19 are conceptual diagrams for describing operations of a sensor controller and a fingerprint controller, according to some embodiments of the present disclosure.

FIG. 14 is a conceptual diagram for describing operations of a sensor controller and a fingerprint controller, according to some embodiments of the present disclosure.

FIG. 14 illustrates an operation of the electronic device 1000 when an input by the input device 2000 and an input by a touch of the user's body 3000 are not present.

Referring to FIGS. 2 and 14, the display layer 100 may display an image in units of one frame period. For example, the one frame period may be defined as a period from a rising edge of a vertical synchronization signal to the next rising edge of the vertical synchronization signal.

When the operating frequency of the display layer 100 is 60 Hertz (Hz), a time corresponding to one frame period may be about 16.44 milliseconds (ms). When the operating frequency of the display layer 100 is 120 Hz, a time corresponding to one frame period may be about 8.33 ms.

While an image of one frame period is displayed on the display layer 100, the sensor controller 200C and the fingerprint controller RC may operate.

During an n-th frame period ('n' is a positive integer), the sensor controller 200C may operate in an uplink period ULK and a first touch period TS1.

The uplink period ULK may be a period for determining whether the input device 2000 is present near the electronic device 1000, through the uplink signal ULS.

During the uplink period ULK, the sensor controller 200C may provide the uplink signal ULS to the outside through the plurality of sensing electrodes TE1 and TE2 (see FIG. 11) of the sensor layer 200.

The uplink signal ULS may include a synchronization signal or information of the electronic device 1000.

The first touch period TS1 may be provided after the uplink period ULK. The first touch period TS1 and the uplink period ULK may be spaced from each other by a time (e.g., a set or predetermined time).

The first touch period TS1 may be a period in which the sensor layer 200 detects whether an input by a touch of the user's body 3000 is present.

During the first touch period TS1, the sensor controller 200C may transmit a first sensing signal to the plurality of first electrodes TE1 (see FIG. 11) and the plurality of second electrodes TE2 (see FIG. 11). While the plurality of first electrodes TE1 (see FIG. 11) and the plurality of second electrodes TE2 (see FIG. 11) are integrated with one electrode, the sensor layer 200 may detect an input by a touch of the user's body 3000. In this case, the sensor layer 200 may be defined as operating in a self-touch method.

During the n-th frame period, the fingerprint controller RC may operate in a standby state.

Figure 15:
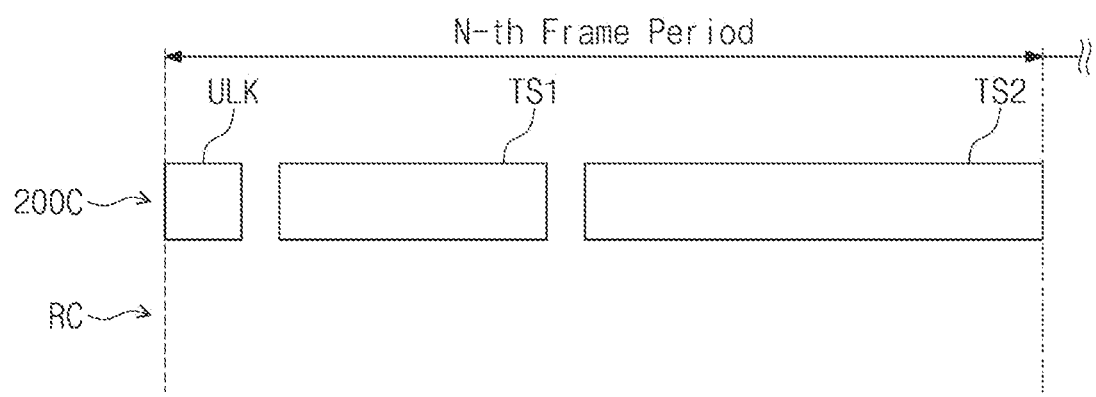

FIG. 15 is a conceptual diagram for describing operations of a sensor controller and a fingerprint controller, according to some embodiments of the present disclosure. In the description of FIG. 15, the same reference numerals are assigned to the same components described with reference to FIG. 14, and thus the descriptions thereof are omitted to avoid redundancy.

FIG. 15 illustrates an operation of the electronic device 1000 in the case where an input by a touch of the user's body 3000 is provided and an input by the input device 2000 is not present.

Referring to FIGS. 2 and 15, during the n-th frame period ('n' is a positive integer), the sensor controller 200C may operate in the uplink period ULK, the first touch period TS1, and a second touch period TS2.

During the first touch period TS1, the sensor layer 200 may detect whether the input by the touch of the user's body 3000 is present. The sensor controller 200C may determine that the input by the touch of the user's body 3000 is being provided during the first touch period TS1. The sensor controller 200C may further operate in the second touch period TS2.

The second touch period TS2 may be provided after the first touch period TS1. The first touch period TS1 and the second touch period TS2 may be spaced from each other by a time (e.g., a set or predetermined time).

During the second touch period TS2, a second sensing signal may be transmitted to the plurality of first electrodes TE1 (see FIG. 11) or the plurality of second electrodes TE2 (see FIG. 11). While the plurality of first electrodes TE1 (see FIG. 11) are capacitively coupled to the plurality of second electrodes TE2 (see FIG. 11), the sensor layer 200 may detect the input by the touch of the user's body 3000. In this case, the sensor layer 200 may be defined as operating in a mutual touch method.

According to some embodiments of the present disclosure, the sensor layer 200 may use both a self-touch method and a mutual touch method to detect an input by a touch of the user's body 3000 during the n-th frame period. The sensor controller 200C may detect coordinates of the input based on a first sensing signal of the first touch period TS1 and a second sensing signal of the second touch period TS2. Accordingly, the electronic device 1000 having improved sensing reliability may be provided.

During the n-th frame period ('n' is a positive integer), the fingerprint controller RC may operate in a standby state.

Figure 16:
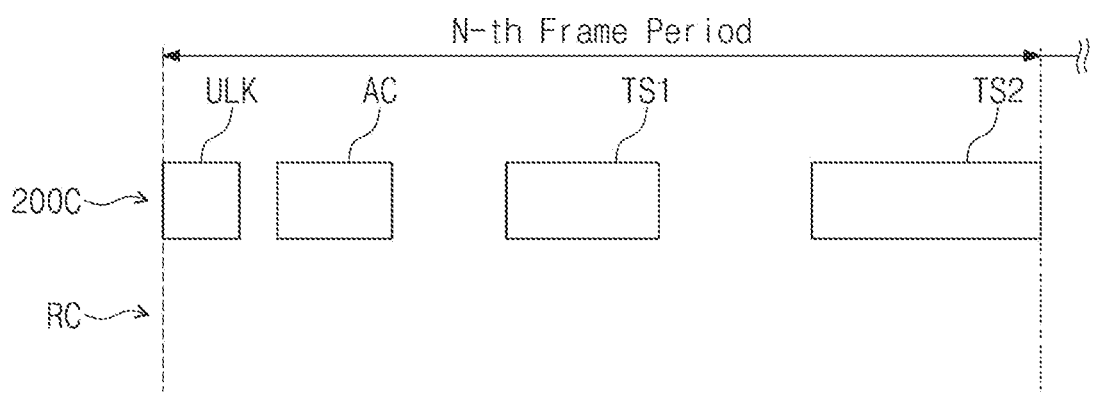
Figure 17:
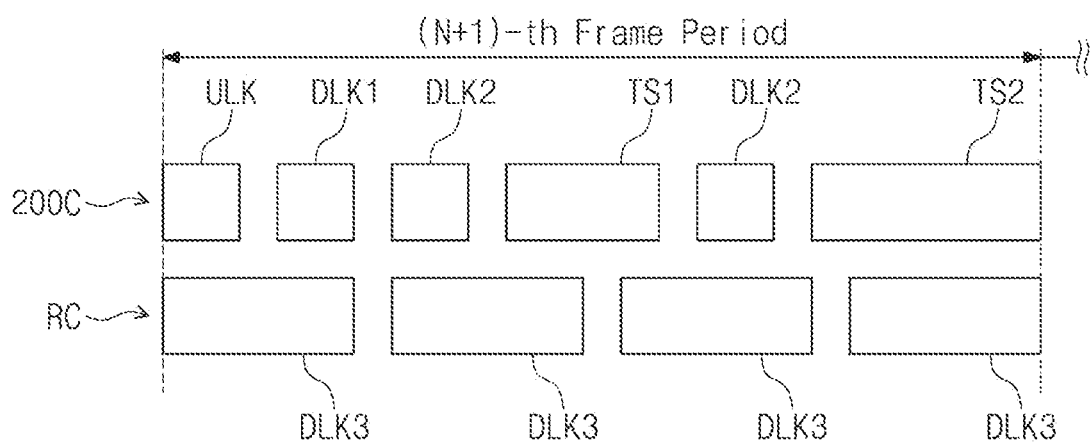

FIGS. 16 and 17 are conceptual diagrams for describing operations of a sensor controller and a fingerprint controller, according to some embodiments of the present disclosure. In the description of FIG. 16, the same reference numerals are assigned to the same components described with reference to FIGS. 14 and 15, and thus the descriptions thereof are omitted to avoid redundancy.

FIG. 16 illustrates an operation in which the input device 2000 and the electronic device 1000 are paired with each other. FIG. 17 illustrates an operation of sensing an input by the input device 2000.

Referring to FIGS. 2, 16, and 17, during the n-th frame period ('n' is a positive integer), the sensor controller 200C may operate in the uplink period ULK, an acknowledgment period AC, the first touch period TS1, and the second touch period TS2.

The acknowledgment period AC may be provided after the uplink period ULK. The acknowledgment period AC and the uplink period ULK may be spaced from each other by a time (e.g., a set or predetermined time).

The acknowledgment period AC may be a period in which the acknowledgment signal ACK for the uplink signal ULS is received from the input device 2000.

The sensor controller 200C may determine that the input device 2000 is present near the electronic device 1000, through the acknowledgment signal ACK.

When receiving the acknowledgment signal ACK, the sensor controller 200C may transmit the control signal CS to the fingerprint controller RC. When receiving the control signal CS, the fingerprint controller RC may be switched from a standby state to an active state.

During a (n+1)-th frame period after the n-th frame period, the sensor controller 200C may operate in the uplink period ULK, a first downlink period DLK1, a second downlink period DLK2, the first touch period TS1, and the second touch period TS2. For example, during the (n+1)-th frame period, the sensor controller 200C may provide the uplink period ULK, the first downlink period DLK1, the second downlink period DLK2, the first touch period TS1, the second downlink period DLK2, and the second touch period TS2, which are sequentially provided.

During the uplink period ULK, the uplink signal ULS may be provided to the input device 2000.

The uplink signal ULS may include a synchronization signal or information of the electronic device 1000. The downlink signal DLS may include a first downlink signal, a second downlink signal, and a third downlink signal.

The synchronization signal may include a signal for synchronizing a third downlink period DLK3 of the fingerprint controller RC with the output timing of the third downlink signal of the second transmission circuit 2430, and a signal for respectively synchronizing the first downlink period DLK1 and the second downlink period DLK2 of the sensor controller 200C with the output timing of the first downlink signal and second downlink signal of the first transmission circuit 2410. That is, the sensor controller 200C and the fingerprint controller RC may be synchronized with the input device 2000 through the uplink signal ULS.

During the first downlink period DLK1, the sensor controller 200C may receive the first downlink signal from the input device 2000. The first downlink signal may include first information. The first information may include information about the state of the input device 2000. For example, the first information may be battery information of the input device 2000. The first downlink signal may be provided to the sensor layer 200 through an input by the input device 2000.

During the second downlink period DLK2, the sensor controller 200C may receive the second downlink signal from the input device 2000. The second downlink signal may be provided to the sensor layer 200 through an input by the input device 2000. The second downlink signal may include second information different from the first information. The second information may include slope information of the input device 2000.

The first downlink period DLK1 and the second downlink period DLK2 may be referred to as "information sensing periods".

The sensor controller 200C may calculate coordinates by detecting an input by a touch of the user's body 3000 by using the first touch period TS1 and the second touch period TS2.

The second downlink period DLK2 may be positioned between the first touch period TS1 and the second touch period TS2.

During the (n+1)-th frame period, the fingerprint controller RC may operate in the third downlink period DLK3. For example, during the (n+1)-th frame period, the fingerprint controller RC may provide the third downlink period DLK3 four times.

According to some embodiments of the present disclosure, during the (n+1)-th frame period, the fingerprint controller RC may provide the plurality of third downlink periods DLK3. The accuracy of coordinates may be improved by detecting the input by the input device 2000 during each of the plurality of third downlink periods DLK3. Accordingly, the electronic device 1000 having improved sensing reliability and the interface device 10000 including the same may be provided.

During the third downlink period DLK3, the fingerprint controller RC may receive the third downlink signal from the input device 2000. The third downlink signal may be provided to the plurality of sensors FX (see FIG. 4) through an input by the input device 2000. The third downlink signal may be provided in a form of an optical signal. The optical signal may include infrared light.

The third downlink signal may include third information different from the first information and the second information. The third information may include coordinate information of the input device 2000. However, this is an example. A configuration included in the first information, the second information, and the third information according to some embodiments of the present disclosure is not limited thereto. For example, the third information may include information about the state of the input device 2000. The information may be provided by adjusting the flickering of the optical signal or the intensity of light.

The third downlink period DLK3 may be referred to as a "coordinate sensing period".

The fingerprint controller RC may detect an input by the input device 2000 by using the third downlink period DLK3, and may transmit the detected input to the sensor controller 200C. The sensor controller 200C may calculate coordinates based on the input. Alternatively, the fingerprint controller RC may calculate coordinates by detecting an input by the input device 2000 by using the third downlink period DLK3.

Unlike embodiments of the present disclosure, when receiving all of the first to third downlink signals within one frame period, the sensor controller 200C may not secure the touch periods TS1 and TS2 for detecting an input by a touch of the user's body 3000. In this case, while the electronic device 1000 is using the input device 2000, the electronic device 1000 may not detect coordinates of the touch of the user's body 3000. However, according to some embodiments of the present disclosure, the third downlink signal may be received by using the plurality of sensors FX (see FIG. 4). The fingerprint controller RC may detect an input by the input device 2000 within one frame period. At the same time, the sensor controller 200C may secure the touch periods TS1 and TS2 for detecting coordinates of a touch of the user's body 3000 within the one frame period. The electronic device 1000 according to some embodiments of the present disclosure may simultaneously secure coordinates by the touch of the user's body 3000 and coordinates by the input device 2000 within one frame period. Accordingly, the electronic device 1000 having improved sensing reliability and the interface device 10000 including the same may be provided.

Furthermore, according to some embodiments of the present disclosure, during the third downlink period DLK3, the fingerprint controller RC may calculate the coordinates of the input device 2000 by using the plurality of sensors FX (see FIG. 4) of which the number per unit area is greater than the plurality of sensing electrodes TE1 and TE2 (see FIG. 11). As compared to a case that the plurality of sensors FX (see FIG. 4) receive the optical signal and then measure movement coordinates of a first input of the input device 2000 by using the sensor layer 200, the plurality of sensors FX (see FIG. 4) may measure the movement the coordinates of the first input of the input device 2000 with a high resolution. The linearity of coordinates for a movement path of the input device 2000 may be improved. Accordingly, the electronic device 1000 having improved sensing reliability and the interface device 10000 including the same may be provided.

Figure 18:
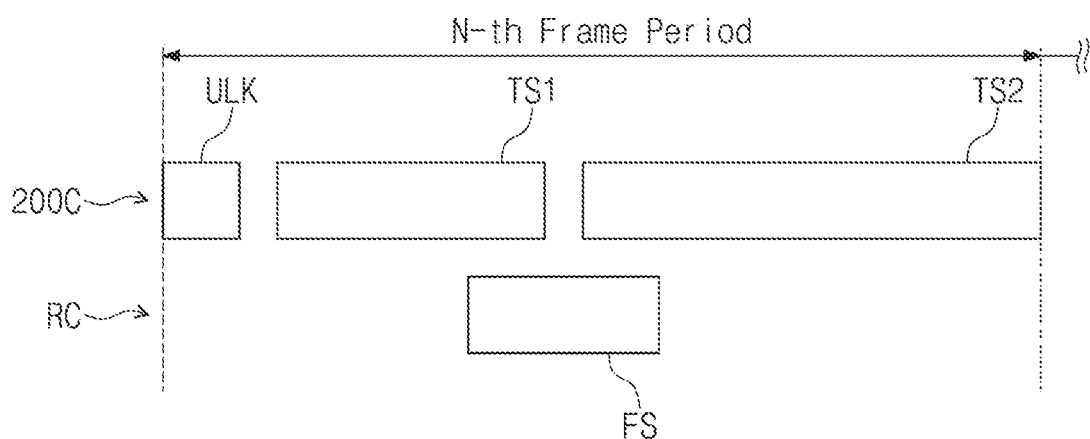

FIG. 18 is a conceptual diagram for describing operations of a sensor controller and a fingerprint controller, according to some embodiments of the present disclosure. In the description of FIG. 18, the same reference numerals are assigned to the same components described with reference to FIG. 15, and thus the descriptions thereof are omitted to avoid redundancy.

FIG. 18 illustrates an operation in which an input by a touch of the user's body 3000 is provided and biometric information of the user's body 3000 is detected.

Referring to FIGS. 2 and 18, when performing an operation of requiring biometric information, the electronic device 1000 may perform an operation of obtaining the biometric information during the n-th frame period ('n' is a positive integer).

The operation requiring the biometric information may include an operation of unlocking the electronic device 1000, an operation of using a mobile pay application for making a payment, an operation of performing authentication in a specific application, and the like.

When performing the operation requiring the biometric information, the driving controller 100C may receive the control signal RCS (see FIG. 4) from the fingerprint controller RC. The fingerprint controller RC receiving the control signal RCS (see FIG. 4) may be switched to an active state.

During the n-th frame period ('n' is a positive integer), the sensor controller 200C may operate in the uplink period ULK, the first touch period TS1, and the second touch period TS2.

The sensor controller 200C may determine whether the input by the touch of the user's body 3000 is applied to an area where the biometric information is sensed through the first touch period TS1 and the second touch period TS2.

Under the control of the driving controller 100C, light may be output from the light emitting elements OLED (see FIG. 6) overlapping the area sensing the biometric information.

During the n-th frame period ('n' is a positive integer), the fingerprint controller RC may operate in a biometric information period FS.

During the biometric information period FS, the fingerprint controller RC may obtain the biometric information based on pieces of reflected light received by the plurality of sensors FX (see FIG. 4).

Figure 19:
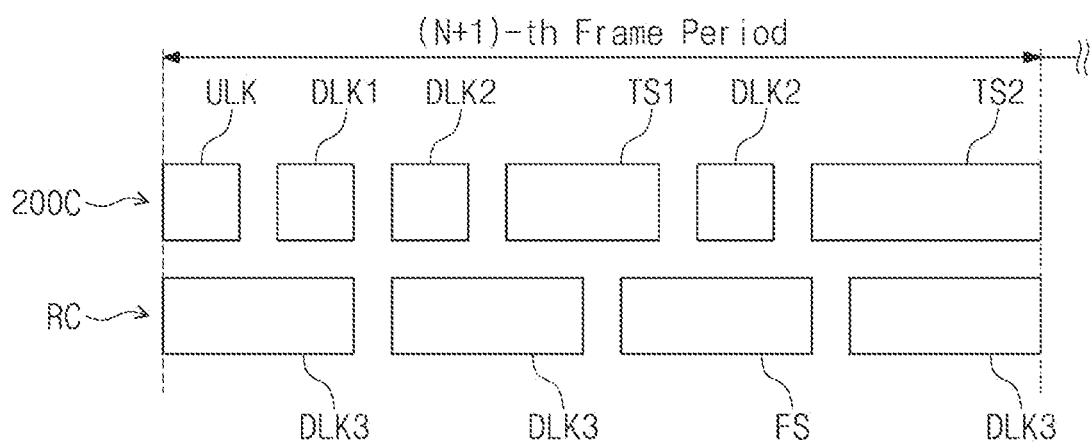

FIG. 19 is a conceptual diagram for describing operations of a sensor controller and a fingerprint controller, according to some embodiments of the present disclosure. In the description of FIG. 19, the same reference numerals are assigned to the same components described with reference to FIG. 17, and thus the descriptions thereof are omitted to avoid redundancy.

Referring to FIGS. 2 and 19, during the (n+1)-th frame period, the fingerprint controller RC may operate in the third downlink period DLK3 and the biometric information period FS. For example, during the (n+1)-th frame period, the fingerprint controller RC may provide the third downlink period DLK3 three times.

According to some embodiments of the present disclosure, the fingerprint controller RC may operate in periods obtained by performing a time division method on one frame period into the biometric information period FS and the third downlink period DLK3. During the one frame period, the fingerprint controller RC may simultaneously detect the biometric information and an input by the input device 2000. Accordingly, the electronic device 1000 providing a better user experience and the interface device 10000 including the electronic device 1000 may be provided.

When performing an operation requiring the biometric information, the sensor controller 200C may determine whether an input by a touch of the user's body 3000 is applied to an area where the biometric information is sensed through the first touch period TS1 and the second touch period TS2.

Under the control of the driving controller 100C, light may be output from the light emitting elements OLED (see FIG. 6) overlapping the area sensing the biometric information.

During the biometric information period FS, the fingerprint controller RC may obtain the biometric information based on pieces of reflected light received by the plurality of sensors FX (see FIG. 4).

According to some embodiments of the present disclosure, during the third downlink period DLK3, the fingerprint controller RC may receive a third downlink signal by using the plurality of sensors FX (see FIG. 4). Moreover, during the biometric information period FS, the fingerprint controller RC may obtain biometric information based on pieces of reflected light received by the plurality of sensors FX (see FIG. 4). The fingerprint controller RC may simultaneously detect the input by the input device 2000 and the biometric information within one frame period. At the same time, the sensor controller 200C may secure the touch periods TS1 and TS2 for detecting coordinates of a touch of the user's body 3000 within the one frame period. Within one frame period, the electronic device 1000 according to some embodiments of the present disclosure may simultaneously secure coordinates by a touch of the user's body 3000, coordinates by the input device 2000, and the biometric information. Accordingly, the electronic device 1000 having improved sensing reliability and the interface device 10000 including the same may be provided. Moreover, the electronic device 1000 providing the improved user experience and the interface device 10000 including the electronic device 1000 may be provided.

Although aspects of some embodiments of the present disclosure have been described for illustrative purposes, those skilled in the art will appreciate that various modifications, and substitutions are possible, without departing from the scope and spirit of the present disclosure as disclosed in the accompanying claims. Accordingly, the technical scope of embodiments according to the present disclosure is not limited to the detailed description of this specification, but should be defined by the claims.

As described above, when viewed from above a plane (e.g., in a plan view), a sensor resolution of a plurality of sensors of a display layer may be higher than that of a plurality of sensing electrodes of the sensor layer. An input device may include a second transmission circuit that outputs an optical signal. As compared to a case that the plurality of sensors receive the optical signal and then measure movement coordinates of a first input of the input device by using the sensor layer, the plurality of sensors may measure the movement coordinates of the first input of the input device with a high resolution. The linearity of coordinates for a movement path of the input device may be improved. Accordingly, it may be possible to provide an electronic device having relatively improved sensing reliability, and an interface device including the same.

Moreover, as described above, a downlink signal of the input device may be received by using the plurality of sensors. A fingerprint controller may detect an input by the input device within one frame period based on the downlink signal. At the same time, a sensor controller may secure a touch period for detecting coordinates by a touch of a user's body within the one frame period. An electronic device according to some embodiments of the present disclosure may simultaneously secure coordinates by a touch of a user's body and coordinates by the input device within one frame period. Accordingly, it may be possible to provide an electronic device having relatively improved sensing reliability, and an interface device including the same.

While the present disclosure has been described with reference to embodiments thereof, it will be apparent to those of ordinary skill in the art that various changes and modifications may be made thereto without departing from the spirit and scope of the present disclosure as set forth in the following claims, and their equivalents.

What is claimed is:

1. An electronic device comprising:
a display layer including a pixel including a pixel driving circuit and a light emitting element, and a sensor including a sensor driving circuit and a sensing element, and configured to display an image during a plurality of frame periods;
a sensor layer on the display layer and configured to exchange a signal with an input device, to receive an optical data signal from the input device, and to sense an input by a touch;
a fingerprint controller configured to control the sensor; and
a sensor controller configured to control the sensor layer,
wherein the sensor is configured to sense a first input by the input device, and a second input by a biometric information, wherein the first input includes infrared light comprising signal data that the sensor is configured to sense,
wherein, in response to the sensor layer sensing the signal from the input device, the sensor controller is configured to transmit a control signal to the fingerprint controller,
wherein the fingerprint controller is configured to provide the sensor controller with information of the first input sensed by the sensor,
wherein the sensor controller calculates coordinates of the touch based on the input by a touch,
wherein the sensor controller calculates slope information of the input device from the signal, and
wherein the fingerprint controller calculates coordinate information of the input device based on the first input.

2. The electronic device of claim 1, wherein, during a first frame period among the plurality of frame periods, the sensor layer is configured to sense the input by the touch, and
wherein, during the first frame period, the sensor is configured to sense the first input.

3. The electronic device of claim 2, wherein, during the first frame period, the sensor layer is further configured to sense a third input by the input device.

4. The electronic device of claim 2, wherein, during the first frame period, the sensor is further configured to sense the biometric information.

5. The electronic device of claim 1, wherein the sensor layer includes a plurality of sensing electrodes, and
wherein an area size of each of the plurality of sensing electrodes is greater than an area size of the sensing element.

6. The electronic device of claim 5, wherein the sensing element includes a plurality of sensing elements, and
wherein a number of the plurality of sensing electrodes per unit area is less than a number of the plurality of sensing elements per the unit area.

7. The electronic device of claim 1, wherein a first frame period among the plurality of frame periods includes an uplink period, an acknowledgment period provided sequentially after the uplink period, and a touch period,
wherein the uplink period is a period in which the sensor controller provides an uplink signal to the input device through the sensor layer,
wherein the acknowledgment period is a period in which the sensor controller receives the signal, which is provided by the input device receiving the uplink signal, and
wherein the touch period is a period in which the sensor layer senses the input by the touch.

8. The electronic device of claim 7, wherein a second frame period, which is provided after the first frame period, from among the plurality of frame periods includes the touch period, an information sensing period, and a coordinate sensing period,
wherein the information sensing period is adjacent to the touch period and is a period in which the sensor layer senses a third input by the input device, and
wherein the coordinate sensing period is a period in which the sensor senses the first input.

9. The electronic device of claim 8, wherein the coordinate sensing period operates in the fingerprint controller, and
wherein the touch period and the information sensing period operate in the sensor controller.

10. An electronic device comprising:
a display layer including a pixel including a pixel driving circuit and a light emitting element, and configured to display an image during a plurality of frame periods;
a sensor layer on the display layer and configured to exchange a signal with an input device, to receive an optical data signal from the input device, and to sense an input by a touch;
a biometric information sensing layer under the display layer and including a sensor;
a fingerprint controller configured to control the sensor; and
a sensor controller configured to control the sensor layer,
wherein the sensor is configured to sense a first input by the input device, and a second input by a biometric information, wherein the first input includes infrared light comprising signal data that the sensor is configured to sense,
wherein, in response to the sensor layer sensing the signal from the input device, the sensor controller is configured to transmit a control signal to the fingerprint controller,
wherein the fingerprint controller is configured to provide the sensor controller with information of the first input sensed by the sensor,
wherein the sensor controller calculates coordinates of the touch based on the input by a touch,
wherein the sensor controller calculates slope information of the input device from the signal, and
wherein the fingerprint controller calculates coordinate information of the input device based on the first input.

11. The electronic device of claim 10, wherein, during a first frame period among the plurality of frame periods, the sensor layer is configured to sense the input by the touch, and
wherein, during the first frame period, the sensor is configured to sense the first input.

12. The electronic device of claim 11, wherein, during the first frame period, the sensor layer is further configured to sense a third input by the input device.

13. The electronic device of claim 11, wherein, during the first frame period, the sensor is further configured to sense the biometric information.

14. An interface device comprising:
an electronic device; and
an input device configured to exchange a signal with the electronic device and to transmit an optical data signal to the electronic device,
wherein the electronic device includes:
a pixel including a pixel driving circuit and a light emitting element;
a biometric information sensing sensor including a sensor driving circuit and a sensing element;
an input sensing sensor including a plurality of sensing electrodes;
a fingerprint controller configured to control the biometric information sensing sensor; and
a sensor controller configured to control the input sensing sensor,
wherein the input device includes:
a reception circuit configured to receive an uplink signal from the input sensing sensor;
a first transmission circuit configured to transmit infrared light comprising signal data to the sensing element; and
a second transmission circuit configured to transmit an acknowledgment signal and a downlink signal to the input sensing sensor,
wherein the biometric information sensing sensor is configured to sense a first input by the infrared light and a second input by a fingerprint,
wherein, in response to the sensor controller sensing the acknowledgment signal from the input device, the sensor controller is configured to transmit a control signal to the fingerprint controller,
wherein the fingerprint controller is configured to provide the sensor controller with information of the first input sensed by the biometric information sensing sensor,
wherein the sensor controller calculates coordinates of a touch based on the second input by the touch,
wherein the sensor controller calculates slope information of the input device from the signal, and
wherein the fingerprint controller calculates coordinate information of the input device based on the first input.

15. The interface device of claim 14, wherein the sensing element is on a same layer as the light emitting element.

16. The interface device of claim 14, wherein the biometric information sensing sensor is under the pixel.

17. The interface device of claim 14, wherein the electronic device is configured to display an image during a plurality of frame periods,
wherein, during a first frame period among the plurality of frame periods, the input sensing sensor is configured to sense an input by the touch, and
wherein, during the first frame period, the biometric information sensing sensor is configured to sense the first input.

18. The interface device of claim 17, wherein, during the first frame period, the input sensing sensor is further configured to sense the downlink signal.

19. The interface device of claim 17, wherein, during the first frame period, the biometric information sensing sensor is further configured to sense a biometric information.

* * * * *